US012598471B2

(12) United States Patent
Celozzi et al.

(10) Patent No.: US 12,598,471 B2
(45) Date of Patent: Apr. 7, 2026

(54) COMMUNICATION NETWORK DEVICES, COMMUNICATION NETWORK SYSTEM AND METHOD FOR MONITORING UNMANNED AERIAL SYSTEMS IN A COMMUNICATION NETWORK

(71) Applicant: Telefonaktiebolaget LM Ericsson (publ), Stockholm (SE)

(72) Inventors: Giuseppe Celozzi, Naples (IT); Domenico Raffaele Cione, Caserta (IT); Daniele Gaito, Pagani (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 68 days.

(21) Appl. No.: 18/845,203

(22) PCT Filed: Mar. 22, 2022

(86) PCT No.: PCT/EP2022/057551
§ 371 (c)(1),
(2) Date: Sep. 9, 2024

(87) PCT Pub. No.: WO2023/179848
PCT Pub. Date: Sep. 28, 2023

(65) Prior Publication Data
US 2025/0193683 A1 Jun. 12, 2025

(51) Int. Cl.
*H04W 12/80* (2021.01)
*G08G 5/26* (2025.01)
(Continued)

(52) U.S. Cl.
CPC ............. *H04W 12/80* (2021.01); *G08G 5/26* (2025.01); *H04W 4/44* (2018.02); *H04W 8/20* (2013.01)

(58) Field of Classification Search
CPC ......... H04W 12/80; H04W 4/44; H04W 8/20; G08G 5/26; G08G 5/57; G08G 5/22;
(Continued)

(56) References Cited

U.S. PATENT DOCUMENTS 9,764,838 B2 * 9/2017 Priest ..................... B64U 10/13
2013/0326631 A1 * 12/2013 Cartmell ............... H04W 12/80
726/26
(Continued)

FOREIGN PATENT DOCUMENTS

WO        2020163760 A2        8/2020
WO        2020163760 A3        8/2020
WO        2021239257 A1        12/2021

OTHER PUBLICATIONS

International Search Report and Written Opinion dated Nov. 8, 2022 for International Application No. PCT/EP2022/057551 filed Mar. 22, 2022; consisting of 17 pages.
(Continued)

*Primary Examiner* — Abiy Getachew
(74) *Attorney, Agent, or Firm* — Weisberg I.P. Law, P.A.

(57) ABSTRACT

A communication network device hosting a lawful interception administration function, LI-ADMF, network element, NE. The device comprises includes interface circuitry, a processor and memory having instructions executable by the processor whereby the communication network device is operative to receive, from a law enforcement agency, LEA, a request to receive information related to at least one unmanned aerial system, UAS, hosted communication device registered with a communication network, send a request to at least one of a mobility management device or a user subscription management device to provide the information, receive at least part of the requested information from at least one of the mobility management device or the
(Continued)

user subscription management device and send the received information to a law enforcement management function, LEMF.

16 Claims, 13 Drawing Sheets

(51) Int. Cl.
*H04W 4/44* (2018.01)
*H04W 8/20* (2009.01)

(58) Field of Classification Search
CPC . G08G 5/55; G08G 5/56; G08G 5/727; H04L 63/306
See application file for complete search history.

(56) References Cited

U.S. PATENT DOCUMENTS

2020/0351616 A1* 11/2020 Vanderveen .......... H04W 12/80
2024/0380792 A1* 11/2024 Gaito .................... H04L 63/306

OTHER PUBLICATIONS

3GPP TS 22.125 V17.4.0; 3rd Generation Partnership Project; Technical Specification Group Services and System Aspects; Uncrewed Aerial System (UAS) support in 3GPP; Stage 1; Release 17; Sep. 2021; consisting of 16 pages.

3GPP TS 23.502 V16.8.0; 3rd Generation Partnership Project; Technical Specification Group Services and System Aspects; Procedures for the 5G System (5GS); Stage 2 (Release 16); Mar. 2021; consisting of 595 pages.

3GPP TS 29.518 V16.8.0; 3rd Generation Partnership Project; Technical Specification Group Core Network and Terminals; 5G System; Access and Mobility Management Services; Stage 3 (Release 16); Jun. 2021; consisting of 304 pages.

3GPP TS 33.128 V16.6.0; 3rd Generation Partnership Project; Technical Specification Group Services and System Aspects; Security; Protocol and procedures for Lawful Interception (LI); Stage 3 (Release 16); Mar. 2021; consisting of 40 pages.

Ericsson; 5G positioning: What you need to know; published on Dec. 18, 2020; printed on Jul. 20, 2021; consisting of 9 pages.

3GPP TS 29.503 V16.7.0; 3rd Generation Partnership Project; Technical Specification Group Core Network and Terminals; 5G System; Unified Data Management Services; Stage 3 (Release 16); Mar. 2021; consisting of 80 pages.

3GPP TS 22.125 V17.5.0 (Download as 3GPP TS 22.125 V17.4.0); 3rd Generation Partnership Project; Technical Specification Group Services and System Aspects; Uncrewed Aerial System (UAS) support in 3GPP; Stage 1; Release 17; Dec. 2021; consisting of 16 pages.

Khan, M.A., et al.; Flying Ad-Hoc Networks (FANETs): A Review of Communication architectures, and Routing protocols; ResearchGate; IEEE; Nov. 2017; consisting of 10 pages.

ETSI TS 103 120 V1.8.1; Technical Specification; Lawful Interception (LI); Interface for warrant information; Mar. 2021; consisting of 71 pages.

ETSI TS 103 221-1 V1.10.1; Technical Specification; Lawful Interception (LI); Internal Network Interfaces; Part 1: X1; Dec. 2021; consisting of 51 pages.

ETSI TS 103 221-2 V1.5.2; Technical Specification; Lawful Interception (LI); Internal Network Interfaces; Part 2: X2/X3; Oct. 2021; consisting of 30 pages.

ETSI TS 129 518 V16.7.0; Technical Specification; 5G; 5G System; Access and Mobility Management Services; Stage 3 (3GPP TS 29.518 version 16.7.0 Release 16); Apr. 2021; consisting of 313 pages.

ETSI TS 101 331 V1.7.1; Technical Specification; Lawful Interception (LI); Requirements of Law Enforcement Agencies Mar. 2021; consisting of 32 pages.

3GPP TS 38.413 V16.6.0; 3rd Generation Partnership Project; Technical Specification Group Radio Access Network; NG-RAN; NG Application Protocol (NGAP) (Release 16); Jul. 2021; consisting of 473 pages.

3GPP TS 23.501 V17.3.0; 3rd Generation Partnership Project; Technical Specification Group Services and System Aspects; System architecture for the 5G System (5GS); Stage 2 (Release 17); Dec. 2021; consisting of 9 pages.

A 5G Americas White Paper; Innovations in 5G Backhaul Technologies, IAB, HFC, & FIBER; 5G Americas; Jun. 2020; consisting of 62 pages.

ETSI TS 103 120 V1.10.1; Technical Specification; Lawful Interception (LI); Interface for warrant information; Dec. 2021; consisting of 72 pages.

ETSI TS 102 232-1 V3.25.1; Technical Specification; Lawful Interception (LI); Handover Interface and Service-Specific Details (SSD) for IP delivery; Part 1: Handover specification for IP delivery; Dec. 2021; consisting of 73 pages.

* cited by examiner

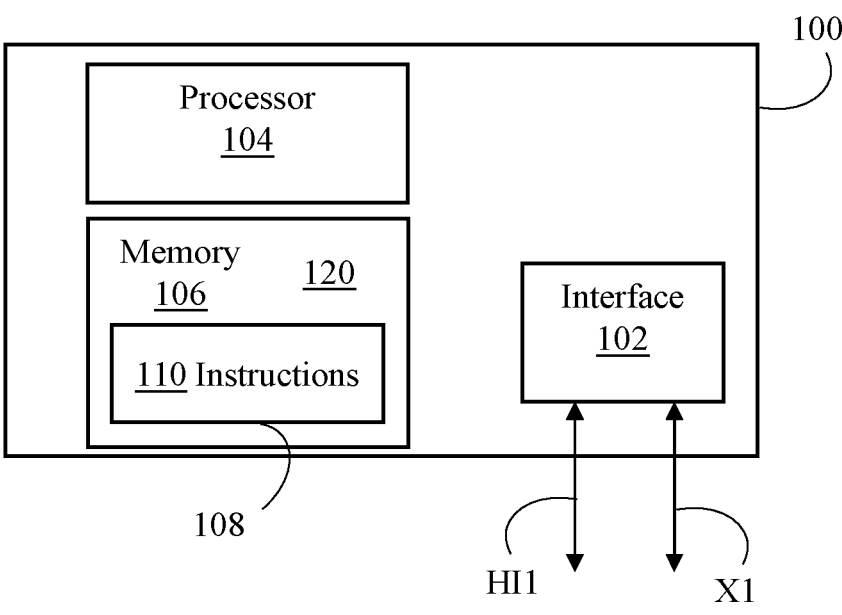
_Fig. 1_
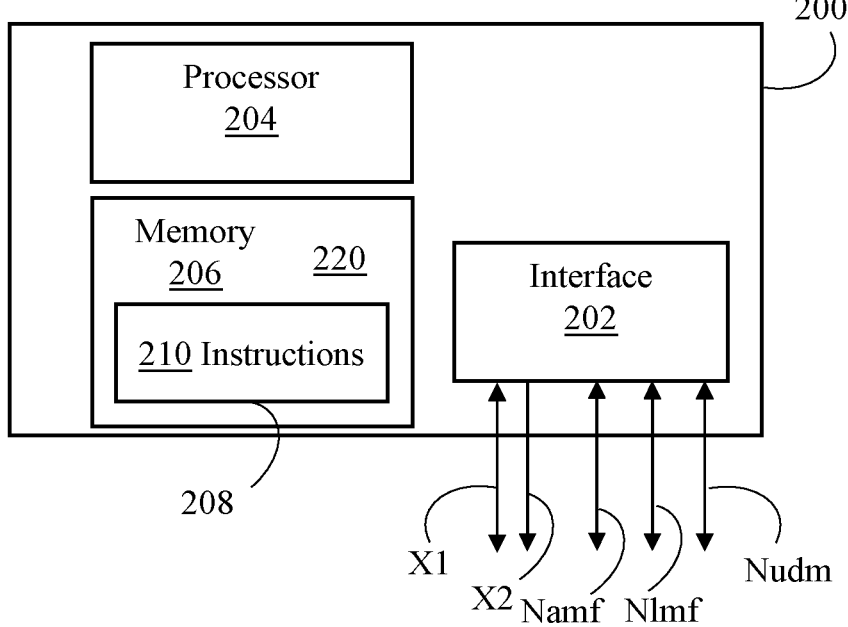
_Fig. 2_

1100

1102 receive, from LEA, a request to receive information related to UAS hosted communication devices registered with communication network 1104 send a request to a mobility management device to provide said information 1106 receive part of said information from the mobility management device 1108 send the received information to an LEMF

1200

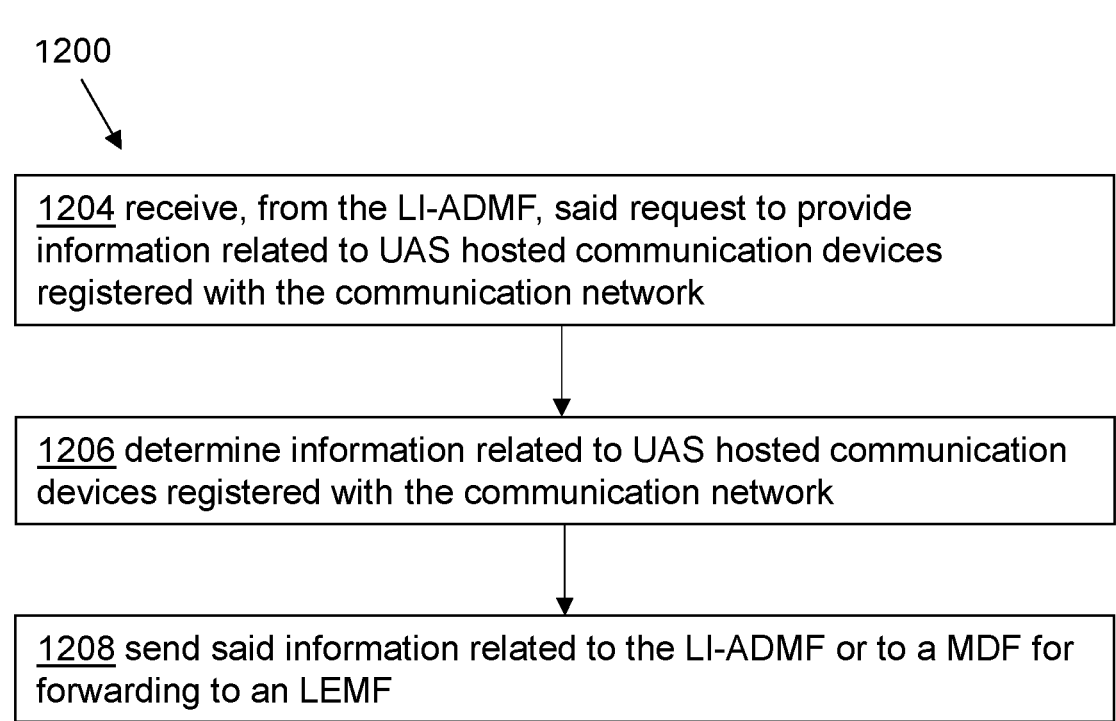

1204 receive, from the LI-ADMF, said request to provide information related to UAS hosted communication devices registered with the communication network

1206 determine information related to UAS hosted communication devices registered with the communication network

1208 send said information related to the LI-ADMF or to a MDF for forwarding to an LEMF

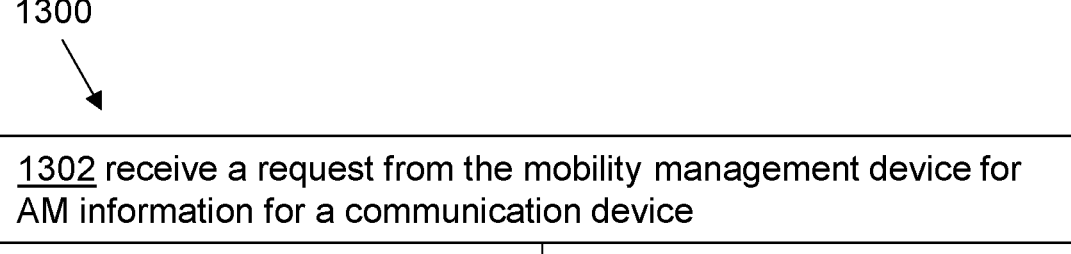

1302 receive a request from the mobility management device for AM information for a communication device

1304 send AM information for the communication device to the mobility management device, the AM information including user profile information indicative of whether the communication device has a subscriber that is authorized for subscribing to UAV services

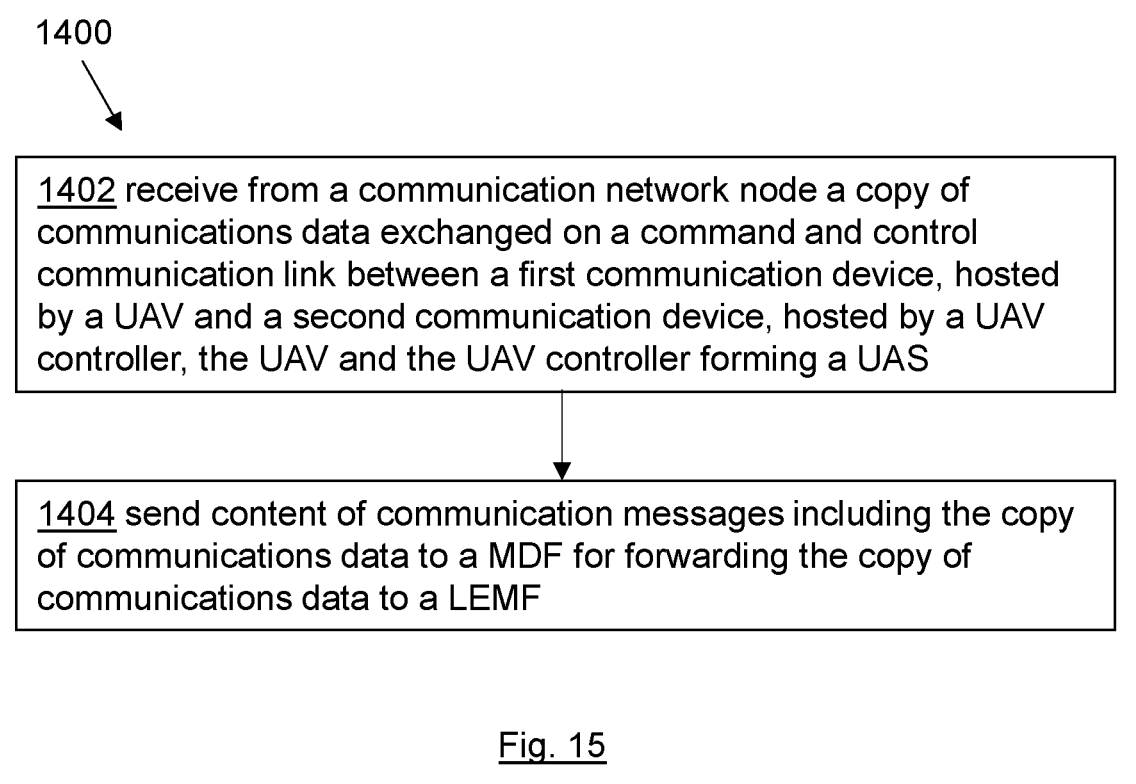

1402 receive from a communication network node a copy of communications data exchanged on a command and control communication link between a first communication device, hosted by a UAV and a second communication device, hosted by a UAV controller, the UAV and the UAV controller forming a UAS 1404 send content of communication messages including the copy of communications data to a MDF for forwarding the copy of communications data to a LEMF

Fig. 15

COMMUNICATION NETWORK DEVICES, COMMUNICATION NETWORK SYSTEM AND METHOD FOR MONITORING UNMANNED AERIAL SYSTEMS IN A COMMUNICATION NETWORK

CROSS-REFERENCE TO RELATED APPLICATION

This application is a Submission Under 35 U.S.C. § 371 for U.S. National Stage Patent Application of International Application Number: PCT/EP2022/057551, filed Mar. 22, 2022 entitled "COMMUNICATION NETWORK DEVICES, COMMUNICATION NETWORK SYSTEM AND METHOD FOR MONITORING UNMANNED AERIAL SYSTEMS IN A COMMUNICATION NET-WORK," the entirety of which is incorporated herein by reference.

TECHNICAL FIELD

The invention relates to communication network devices hosting a lawful interception administration function, LI-ADMF, a mobility management device, a user subscription management device, and a user payload data management device, respectively. The invention further relates to a communication network system comprising communication network devices hosting a LI-ADMF, a mobility management device, a user subscription management device, and a user payload data management device, respectively. The invention further relates to a method for monitoring unmanned aerial systems, UAS, in a communication network, a computer program, and a computer program product.

BACKGROUND

An UAS is the combination of an Unmanned Aerial Vehicle, UAV, and a UAV controller. A UAV is an aircraft, without a pilot onboard, which can be controlled by an operator via a UAV controller and will have a range of autonomous flight capabilities.

UAVs range in size and weight from small, light aircraft often used for recreational purposes to large, heavy aircraft which are often more suited to commercial applications. Regulatory requirements vary across this range and on a regional basis.

3GPP TS 22.125 standard document, such as v17.5.0, describes a "UAS Reference Model in 3GPP ecosystem" as follows: a UAS is composed of one UAV and one UAV controller; UAVs are connected over cellular connectivity; a UAV can be controlled by a UAV controller connected via the 3GPP mobile network; a UAV can be controlled by a UAV controller not connected via the 3GPP mobile network, using a C2 interface not in 3GPP scope; a UAV controller connected via the 3GPP mobile network can control one or more UAV(s); and the UAS exchanges application data traffic with a UAS Traffic Management, UTM, device. UAV communication between the UAV and the UAV controller can use 4G and 5G communication channels.

The communication requirements for UAS cover both a Command and Control, C2, communication link, and uplink and downlink data to/from the UAS components towards both the serving 3GPP network and network servers. When using 3GPP network as the transport network for supporting UAS services, various C2 communication types are feasible. Using direct C2 communication, the UAV controller and UAV establish a direct C2 link to communicate with each other and both are registered to the 5G network using the radio resource configured and scheduled provided by the 5G network for direct C2 communication. Using Network-Assisted C2 communication, the UAV controller and UAV register and establish respective unicast C2 communication links to the 5G network and communicate with each other via the 5G network. Also, both the UAV controller and UAV may be registered to the 5G network via different next generation radio access network, NG-RAN, nodes. Using UTM-Navigated C2 communication, the UAV is provided with a pre-scheduled flight plan, e.g. an array of 4D polygons, for autonomous flying, however the UTM still maintains a C2 communication link with the UAV in order to regularly monitor the flight status of the UAV, verify the flight status with up-to-date dynamic restrictions, provide route updates, and navigate the UAV if necessary. For example, Direct C2 communication can be used at first and then switch to the Network-Assisted C2 communication when the UAV is flying beyond line of sight (BLOS). Alternatively, UTM-navigated C2 communication can be utilized whenever needed, e.g. for air traffic control, the UAV is approaching a No Drone Zone, and detected potential security threats, etc.

There are four control modes considered in the C2 communication for the UAV operation that have different requirements, e.g. on message intervals, sizes, and end to end latencies. In the Steer to waypoints control mode, the control message contains flight declaration, e.g. waypoints, sent from the UAV controller or UTM to the UAV. This control mode is used in both of direct C2 communication and network-assisted C2 communication. In the Direct stick steering control mode, the control message contains direction instructions sent from the UAV controller to the UAV while optionally video traffic is provided as feedback from the UAV to the UAV controller. This control mode is used in both of direct C2 communication and network-assisted C2 communication. In the Automatic flight by UTM control mode, the control message contains a pre-scheduled flight plan, e.g. array of 4D polygons, sent from the UTM to the UAV, which thereafter flies autonomously with periodic position reporting. This control mode is used in UTM-Navigated C2 communication. In the Approaching autonomous navigation infrastructure control mode, the control message contains direction instructions, e.g. waypoints, altitudes, and speeds from the UTM to the UAV. When the UAV is landing/departing, the UTM coordinates more closely with autonomous navigation infrastructure, e.g. vertiport or package distribution centre. This control mode is used in UTM-Navigated C2 communication.

Requirements for UAV Positioning performance are described in clause 7.3 of 3GPP TS 22.125 standard, such as v17.5.0, for various scenarios. For each scenario, corresponding positioning requirements for horizontal and vertical accuracy, availability, heading, latency and user equipment, UE, speed are provided.

When a UAV and a UAV Controller are connected using the 3GPP mobile network there is no specific information provided identifying that a UE hosted by the UAV or a UAV Controller is part of a UAS. It is important to be able to track the position of a UAV considering the specificity of the equipment (height and frequency of the updated position to give a tri-dimensional location and also to understand the speed and direction of the vehicle). The position of a UE can be monitored using the enhancements made to the location services made for LTE and 5G, as reported by Muhammad Asghar Khan et al., "Flying Ad-Hoc Networks (FANETs): A Review of Communication architectures, and Routing Protocols", IEEE First International Conference on Latest trends in Electrical Engineering and Computing Technologies, 2017.

There is a need to enable the monitoring of drones to ensure that the flying rules imposed by the authorities are met, among other things.

SUMMARY

It is an object to enable improved monitoring of the position of UAVs or improved monitoring of communications data between a UAV and a UAV Controller of a UAS.

A first aspect provides a communication network device hosting a lawful interception administration function, LI-ADMF, network element, NE. The communication network device comprises interface circuitry, at least one processor and memory. The memory comprises instructions executable by the at least one processor whereby the communication network device is operative as follows. The communication network device is operative to receive, from a law enforcement agency, LEA, a request to receive information related to at least one unmanned aerial system, UAS, hosted communication device registered with a communication network. The communication network device is operative to send a request to at least one of a mobility management device or a user subscription management device to provide said information. The communication network device is operative to receive at least part of the requested information from at least one of the mobility management device or the user subscription management device and to send the received information to a law enforcement management function, LEMF.

The communication network device may enable misuse of UAVs to be determined and authorities to be informed about it. The communication network device may be used in a virtualized network function, VNF, environment or native cloud architecture of 5G to enable user equipment, UE, that are UAVs, to be discovered even if the UE subscriber is not subscribed to UAV services. The communication network device may verification that UAVs are following flying rules, to monitor UAV communications, to detect a change of subscriber identity module, SIM, in a UAV. The communication network device may enable monitoring UAV locations and to determine UAV flight plan deviation or violation of allowed capabilities, such as maximum height or range. This may be useful when UAVs enter specific areas considered sensitive (no UAV zones) or the heights of the UAS/UAV is outside the allowed height for the use of the UAV. The UAV feature of 5G networks allows a UAV to communicate with a UAV controller through a direct control and communication, C2, link, the communication network device may enable proper monitoring of UAS hosted UEs to be compliant with lawful interception, LI, systems for telecommunication networks.

In an embodiment, the request to provide information includes at least one of: a request to receive a list of all communication devices having subscribers that are subscribed to UAV services; a request to provide information to at least one mediation and delivery function, MDF, about new communication devices having subscribers that are subscribed to UAV services; a request to provide information to at least one MDF about a change of a subscriber identity module, SIM, in a communication device having a subscriber that is subscribed to UAV services; a request to provide information to at least one MDF about communication devices having subscribers that are subscribed to UAV services violating at least one flying rule; a request to provide information to at least one MDF about communication devices having subscribers that are subscribed to UAV services being used as an integrated access and backhaul, IAB, node; or a request to provide information to at least one MDF about UAS hosted communication devices having subscribers that are not subscribed to UAV services. The communication network device is further operative to receive a list of all communication devices having subscribers that are subscribed to UAV services from the user subscription management device.

In an embodiment, the communication network device is further operative to receive from the LEA a request for monitoring for lawful interception, LI, purposes of a target communication device of the communication devices having subscribers that are subscribed to UAV services. The communication network device is further operative to send to the mobility management device a request to subscribe for monitoring for LI purposes of the target communication device.

Corresponding embodiments and advantages apply to the communication network system and the method described below.

A second aspect provides a communication network device hosting a mobility management device. The communication network device comprises interface circuitry, at least one processor and memory. The memory comprises instructions executable by the at least one processor whereby the communication network device is operative as follows. The communication network device is operative to receive, from a lawful interception administration function, LI-ADMF, a request to provide information related to at least one unmanned aerial system, UAS, hosted communication device, registered with a communication network. The communication network device is operative to determine information related to at least one UAS hosted communication device registered with the communication network. The communication network device is operative to send said information to the LI-ADMF or to a mediation and delivery function, MDF, for forwarding to a law enforcement management function, LEMF.

The communication network device may enable misuse of UAVs to be determined and authorities to be informed about it. The communication network device may be used in a virtualized network function, VNF, environment or native cloud architecture of 5G to enable user equipment, UE, that are UAVs, to be discovered even if the UE subscriber is not subscribed to UAV services. The communication network device may enable verification that UAVs are following flying rules, to monitor UAV communications, to detect a change of subscriber identity module, SIM, in a UAV. The communication network device may enable monitoring UAV locations and to determine UAV flight plan deviation or violation of allowed capabilities, such as maximum height or range. This may be useful when UAVs enter specific areas considered sensitive (no UAV zones) or the heights of the UAS/UAV is outside the allowed height for the use of the UAV. The UAV feature of 5G networks allows a UAV to communicate with a UAV controller through a direct control and communication, C2, link, the communication network device may enable proper monitoring of UAS hosted UEs to be compliant with lawful interception, LI, systems for telecommunication networks.

In an embodiment, the request to provide information includes a request to receive a list of all communication devices having subscribers that are subscribed to unmanned aerial vehicle, UAV, services. The communication network device is operative to send the list of all communication devices having subscribers that are subscribed to UAV services to the LI-ADMF.

In an embodiment, the communication network device is further operative to request user profile information for communication devices from a user subscription management device. The communication network device is further operative to receive user profile information for communication devices. The user profile information includes UAV context information including an indication that a communication device has a subscriber that is authorised for subscribing to UAV services and at least one flying rule for a UAV hosting the communication device.

In an embodiment, to determine said information related to at least one UAS hosted communication device the communication network device is further operative to receive communication device positioning information from a location management function, LMF, and to determine, based on the positioning information and the UAV context information, whether at least one flying rule is being broken by the UAV hosting the communication device.

In an embodiment, to determine said information related to at least one UAS hosted communication device the communication network device is further operative to receive communication device positioning information from a location management function, LMF, and to receive information from a communication device about interference on frequencies that the communication device is using. The communication network device is further operative to determine, based on the communication device positioning information and the interference information, that the communication device is acting as integrated access and backhaul, IAB, node.

In an embodiment, to determine said information related to at least one UAS hosted communication device the communication network device is further operative to determine, based on the UAV context information, that a communication device has a subscriber that is not authorised for subscribing to UAV services. The communication network device is further operative to receive communication device positioning information for the communication device from a location management function, LMF, and to determine based on the UE positioning information that the communication device is hosted by a UAV.

In an embodiment, the user profile information further includes a subscriber identifier of a communication device. To determine said information related to at least one UAS hosted communication device the communication network device is further operative to determine a change has occurred in the subscriber identifier of a communication device having a subscriber subscribed to UAV services.

In an embodiment, the communication network device is further operative to receive from the LI-ADMF a request to subscribe for monitoring for lawful interception, LI, purposes of a target communication device of the communication devices having subscribers subscribed to UAV services. The communication network device is further operative to send a request to a point of interception, POI, of the communication network to send intercept related information to a mediation and delivery function, MDF.

Corresponding embodiments and advantages apply to the communication network system and the method described below.

A third aspect provides a communication network device hosting a user subscription management device. The communication network device comprises interface circuitry, at least one processor and memory. The memory comprises instructions executable by the at least one processor whereby the communication network device is operative as follows. The communication network device is operative to receive a request from a mobility management device for access and mobility subscription, AM, information for a communication device. The communication network device is operative to send AM information for the UE to the mobility management device. The AM information includes user profile information indicative of whether the communication device has a subscriber that is authorized for subscribing to unmanned aerial vehicle, UAV, services. The communication network device is further operative to receive, from a lawful interception administration function, LI-ADMF, a request to provide information related to at least one unmanned aerial system, UAS, hosted communication device, registered with a communication network.

The communication network device may enable misuse of UAVs to be determined and authorities to be informed about it. The communication network device may be used in a virtualized network function, VNF, environment or native cloud architecture of 5G to enable user equipment, UE, that are UAVs, to be discovered even if the UE subscriber is not subscribed to UAV services. The communication network device may enable verification that UAVs are following flying rules, to monitor UAV communications, to detect a change of subscriber identity module, SIM, in a UAV. The communication network device may enable monitoring UAV locations and to determine UAV flight plan deviation or violation of allowed capabilities, such as maximum height or range. This may be useful when UAVs enter specific areas considered sensitive (no UAV zones) or the heights of the UAS/UAV is outside the allowed height for the use of the UAV. The UAV feature of 5G networks allows a UAV to communicate with a UAV controller through a direct control and communication, C2, link, the communication network device may enable proper monitoring of UAS hosted UEs to be compliant with lawful interception, LI, systems for telecommunication networks.

In an embodiment, the user profile information includes UAV context information indicating whether the communication device has a subscriber that is authorised for subscribing to UAV services and defining at least one flying rule for a UAV hosting the communication device.

In an embodiment, the request received from the LI-ADMF includes at least one of: a request to receive a list of all communication devices having subscribers that are subscribed to UAV services; a request to provide information to at least one mediation and delivery function, MDF, about new communication devices having subscribers that are subscribed to UAV services; or a request to provide information to at least one MDF about a change of a subscriber identity module, SIM, in a communication device having a subscriber that is subscribed to UAV services. The communication network device is further operative to send a list of all communication devices having subscribers that are subscribed to UAV services to the LI-ADMF. The communication network device is further operative to send to at the least one MDF at least one of: information about new communication devices having subscribers that are subscribed to UAV services; or information about a change of a subscriber identity module, SIM, in a communication device having a subscriber that is subscribed to UAV services.

Corresponding embodiments and advantages apply to the communication network system and the method described below.

A fourth aspect provides a communication network device hosting a user payload data management device. The communication network device comprises interface circuitry, at least one processor and memory. The memory comprises instructions executable by the at least one processor whereby the communication network device is operative as follows. The communication network device is operative to receive from a communication network node a copy of communications data exchanged on a command and control communication link between a first communication device, hosted by an unmanned aerial vehicle, UAV, and a second communication device hosted by a UAV controller. The UAV and the UAV controller form an unmanned aerial system, UAS. The communication network device is operative to send content of communication messages including said copy of communications data to a mediation and delivery function, MDF, for forwarding said copy of communications data to a law enforcement management function, LEMF.

The communication network device may enable misuse of UAVs to be determined and authorities to be informed about it. The communication network device may be used in a virtualized network function, VNF, environment or native cloud architecture of 5G to enable user equipment, UE, that are UAVs, to be discovered even if the UE subscriber is not subscribed to UAV services. The communication network device may enable verification that UAVs are following flying rules, to monitor UAV communications, to detect a change of subscriber identity module, SIM, in a UAV. The communication network device may enable monitoring UAV locations and to determine UAV flight plan deviation or violation of allowed capabilities, such as maximum height or range. This may be useful when UAVs enter specific areas considered sensitive (no UAV zones) or the heights of the UAS/UAV is outside the allowed height for the use of the UAV. The UAV feature of 5G networks allows a UAV to communicate with a UAV controller through a direct control and communication, C2, link, the communication network device may enable proper monitoring of UAS hosted UEs to be compliant with lawful interception, LI, systems for telecommunication networks.

A fifth aspect provides a communication network system comprising a first communication network device hosting a lawful interception administration function, LI-ADMF, network element, NE, a second communication network device hosting a mobility management device, a third communication network device hosting a user subscription management device, and a fourth communication network device hosting a user payload data management device.

The first communication network device comprises interface circuitry, at least one processor and memory. The memory comprises instructions executable by the at least one processor whereby the first communication network device is operative as follows. The first communication network device is operative to receive, from a law enforcement agency, LEA, a request to receive information related to at least one unmanned aerial system, UAS, hosted communication device registered with a communication network. The first communication network device is operative to send a request to at least one of a mobility management device or a user subscription management device to provide said information. The first communication network device is operative to receive at least part of the requested information from at least one of the mobility management device or the user subscription management device and to send the received information to a law enforcement management function, LEMF.

The second communication network device comprises interface circuitry, at least one processor and memory. The memory comprises instructions executable by the at least one processor whereby the second communication network device is operative as follows. The second communication network device is operative to receive, from the LI-ADMF, the request to provide information related to at least one UAS hosted communication device, registered with the communication network. The second communication network device is operative to determine information related to at least one UAS hosted communication device registered with the communication network. The second communication network device is operative to send said information to the LI-ADMF or to a mediation and delivery function, MDF, for forwarding to a law enforcement management function, LEMF.

The third communication network device comprises interface circuitry, at least one processor and memory. The memory comprises instructions executable by the at least one processor whereby the third communication network device is operative as follows. The third communication network device is operative to receive the request from the mobility management device AM information for a communication device. The third communication network device is operative to send AM information for the UE to the mobility management device. The AM information includes user profile information indicative of whether the communication device has a subscriber that is authorized for subscribing to unmanned aerial vehicle, UAV, services. The third communication network device is further operative to receive, from a lawful interception administration function, LI-ADMF, a request to provide information related to at least one unmanned aerial system, UAS, hosted communication device, registered with a communication network.

The fourth communication network device comprises interface circuitry, at least one processor and memory. The memory comprises instructions executable by the at least one processor whereby the fourth communication network device is operative as follows. The fourth communication network device is operative to receive from a communication network node a copy of communications data exchanged on a command and control communication link between a first communication device, hosted by an unmanned aerial vehicle, UAV, and a second communication device hosted by a UAV controller. The UAV and the UAV controller form a UAS. The fourth communication network device is operative to send content of communication messages including said copy of communications data to a mediation and delivery function, MDF, for forwarding said copy of communications data to the LEMF.

The communication network system may enable misuse of UAVs to be determined and authorities to be informed about it. The communication network system may be used in a virtualized network function, VNF, environment or native cloud architecture of 5G to discover user equipment, UE, that are UAVs, even if the UE subscriber is not subscribed to UAV services. The communication network system may be used to verify that UAV are following flying rules, to monitor UAV communications, to detect a change of subscriber identity module, SIM, in a UAV. The communication network system may be used to monitor UAV location and to determine UAV flight plan deviation or violation of allowed capabilities, such as maximum height or range. This may be useful when UAVs enter specific areas considered sensitive (no UAV zones) or the heights of the UAS/UAV is outside the allowed height for the use of the UAV. The UAV feature of 5G networks allows a UAV to communicate with a UAV controller through a direct control and communication, C2, link, the communication network system enables proper monitoring of UAS hosted UEs to be compliant with lawful interception, LI, systems for telecommunication networks.

In an embodiment, the communication network system further comprises a fifth communication network device hosting a mediation and delivery function, MDF. The fifth communication network device comprises interface circuitry, at least one processor and memory comprising instructions executable by the at least one processor whereby the fifth communication network device is operative to perform at least one of: receive intercept related information relating to a target communication device and send the intercept related information to the LEMF; receive information related to at least one UAS hosted communication device registered with the communication network from the second communication network device and send said information to the LEMF; receive information related to at least one UAS hosted communication device registered with the communication network from the third communication network device and send said information to the LEMF; or receive content of communication messages including a copy of communications data exchanged on a command and control communication link between the first communication device, hosted by a UAV, and the second communication device hosted by a UAV controller, and send said copy of communications data to the LEMF.

Corresponding embodiments and advantages apply to the method described below.

A sixth aspect provides a method for monitoring unmanned aerial systems, UAS, in a communication network. The method comprises the following performed by a lawful interception administration function, LI-ADMF, network element, NE. Receiving, from a law enforcement agency, LEA, a request to receive information related to at least one unmanned aerial system, UAS, hosted communication device registered with the communication network. Sending a request to a mobility management device to provide said information. Receiving part of said information from the mobility management device, and a step of sending the received information to a law enforcement management function, LEMF. The method further comprises the following performed by a mobility management device. Receiving, from the LI-ADMF, said request to provide information related to at least one UAS hosted communication device registered with the communication network. Determining information related to at least one UAS hosted communication device registered with the communication network. Sending said information to the LI-ADMF or to a mediation and delivery function, MDF, for forwarding to the law enforcement management function, LEMF. The method further comprises the following performed by a user subscription management device. Receiving a request from the mobility management device for access and mobility subscription, AM, information for a communication device. Sending AM information for the communication device to the mobility management device. The AM information includes user profile information indicative of whether the communication device has a subscriber that is authorized for subscribing to unmanned aerial vehicle, UAV, services. The method further comprises the following performed by a user payload data management device. Receiving from a communication network node a copy of communications data exchanged on a command and control communication link between a first communication device, hosted by an unmanned aerial vehicle, UAV, and a second communication device, hosted by a UAV controller, the UAV and the UAV controller forming an unmanned aerial system, UAS. Sending content of communication messages including said copy of communications data to a mediation and delivery function, MDF, for forwarding said copy of communications data to the LEMF.

The method may enable misuse of UAVs to be determined and authorities to be informed about it. method used in a virtualized network function, VNF, environment or native cloud architecture of 5G to enable user equipment, UE, that are UAVs, to be discovered even if the UE subscriber is not subscribed to UAV services. The method may enable verification that UAVs are following flying rules, to monitor UAV communications, to detect a change of subscriber identity module, SIM, in a UAV. The method may enable monitoring UAV locations and to determine UAV flight plan deviation or violation of allowed capabilities, such as maximum height or range. This may be useful when UAVs enter specific areas considered sensitive (no UAV zones) or the heights of the UAS/UAV is outside the allowed height for the use of the UAV. The UAV feature of 5G networks allows a UAV to communicate with a UAV controller through a direct control and communication, C2, link, the method enables proper monitoring of UAS hosted UEs to be compliant with lawful interception, LI, systems for telecommunication networks.

In an embodiment, the method further comprises at least one of the following performed by a mediation and delivery function, MDF. Receiving intercept related information relating to a target communication device and sending the intercept related information to a law enforcement management function, LEMF. Receiving information related to at least one unmanned aerial system, UAS, hosted communication device registered with a communication network from the second communication network device and sending said information to the LEMF. Receiving information related to at least one UAS hosted communication device registered with the communication network from the third communication network device and sending said information to the LEMF. Receiving content of communication messages including a copy of communications data exchanged on the command and control communication link between the first communication device, hosted by a UAV and the second communication device hosted by a UAV controller and sending said copy of communications data to the LEMF.

In an embodiment, the method further comprising the following performed by the LI-ADMF NE. Receiving from the LEA a request for monitoring for lawful interception, LI, purposes of a target communication device of the communication devices having subscribers subscribed to UAV services. Sending to the mobility management device a request to subscribe for monitoring for LI purposes of the target communication device. The method further comprises the following performed by the mobility management device. Receiving from the LI-ADMF NE the request to subscribe for monitoring for LI purposes of the target communication device. Sending a request to a point of interception, POI, of the communication network to send intercept related information to a mediation and delivery function, MDF. The method further comprises the following performed by the user payload data management device. Receiving from a communication network node a copy of communications data exchanged on a command and control communication link used by the target communication device. Sending content of communication messages including said copy of communications data to a mediation and delivery function, MDF, for forwarding said copy of communications data to the law enforcement management function, LEMF.

A seventh aspect provides a computer program comprising instructions which when executed by at least one processor cause the at least one processor to perform the above method for monitoring unmanned aerial systems, UAS, in a communication network.

An eighth aspect provides a computer program product which comprises a computer readable storage medium on which the above computer program is stored.

Embodiments of the invention will now be described, by way of example only, with reference to the accompanying drawings.

BRIEF DESCRIPTION OF THE DRAWINGS

FIG. 1 is a block diagram illustrating an embodiment of a communication network device hosting a lawful interception administration function, LI-ADMF, network element, NE;

FIG. 2 is a block diagram illustrating an embodiment of a communication network device hosting a mobility management device;

FIGS. 12 to 16 are flowcharts illustrating embodiments of methods.

DETAILED DESCRIPTION

Figure 3:
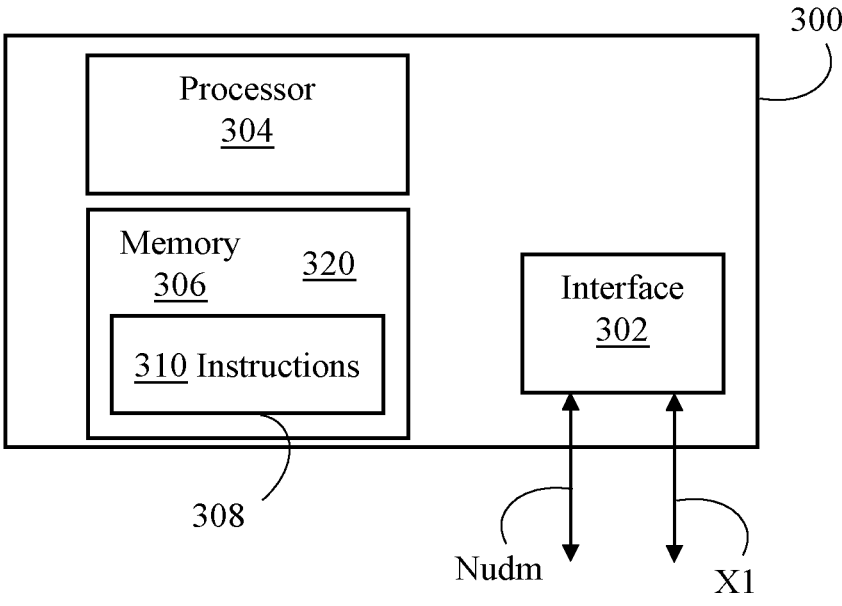
FIG. 3 is a block diagram illustrating an embodiment of a communication network device hosting a user subscription management device.

The same reference numbers are used for corresponding features in different embodiments.

Referring to FIG. 1, an embodiment provides a communication network device 100 hosting a lawful interception administration function, LI-ADMF, network element, NE. The communication network device 100 comprises interface circuitry 102, a processor 104 and memory 106. The memory comprises instructions 110 executable by the processor whereby the communication network device is operative as follows. The communication network device 100 is operative to receive a request from a law enforcement agency, LEA. The request from the LEA is a request to receive information related to at least one unmanned aerial system, UAS, hosted communication device registered with a communication network. The communication network device 100 is operative to send a request to a mobility management device and/or a user subscription management device to provide the information related to at least one UAS hosted communication device requested by the LEA. The communication network device 100 is operative to receive at least part of the requested information from the mobility management device and/or the user subscription management device. The communication network device 100 is operative to send the received information to a law enforcement management function, LEMF.

A UAS is formed of an unmanned aerial vehicle, UAV, and a UAV controller. A mobility management device may be a communication device which comprises a mobility management entity or function, such as a 3GPP 4G LTE mobility management entity, MME, a 3GPP 5G access and mobility management function, AMF, and/or a future network corresponding function, such for a 3GPP 6G network.

A communication device may be a user equipment, UE, or a tamper-resistant circuit such as a UICC which comprises at least one subscriber identity module, SIM, such as a USIM and/or an ISIM. The UICC may be a removable UICC, an embedded UICC or an integrated UICC. The UAS hosted communication device is registered in a subscription management entity, such as a Unified Data Management, UDM, in a 5G 3GPP core network belonging to a Communication Service Provider, CSP, or network operator, or in another register in a database of an application server belonging to the CSP.

In an embodiment, the communication network device 100 is operative to send the request to provide information related to at least one UAS hosted communication device to the mobility management device, the request to provide information including a request to receive a list of all communication devices having subscribers that are subscribed to UAV services. The communication network device 100 is operative to receive a list of all communication devices having subscribers that are subscribed to UAV services from the mobility management device and send the received list to the LEMF.

In an embodiment, the communication network device 100 is operative to send the request to provide information related to at least one UAS hosted communication device to the user subscription management device. The request to provide information includes at least one of:

a request to provide information to at least one mediation and delivery function, MDF, about new communication devices having subscribers that are subscribed to UAV services;

a request to provide information to at least one MDF about a change of a SIM in a communication device having a subscriber that is subscribed to UAV services;

a request to provide information to at least one MDF about communication devices having subscribers that are subscribed to UAV services violating at least one flying rule;

a request to provide information to at least one MDF about communication devices having subscribers that are subscribed to UAV services being used as an integrated access and backhaul, IAB, node; or a request to provide information to at least one MDF about at least one UAS hosted communication device having a subscriber that is not subscribed to UAV services.

In an embodiment, the communication network device 100 is further operative to receive a request for monitoring for lawful interception, LI, purposes from the LEA. The request is for LI monitoring of a target communication device of the communication devices having subscribers that are subscribed to UAV services. The communication network device 100 is further operative to send a request to the mobility management device to subscribe for monitoring for LI purposes of the target communication device.

An embodiment provides communication network device 200 hosting a mobility management device, as illustrated in FIG. 2. The communication network device comprises interface circuitry 202, a processor 204 and memory 206. The memory comprises instructions 210 executable by the processor whereby the communication network device 200 is operative as follows. The communication network device 200 is operative to receive, from an LI-ADMF, a request to provide information related to at least one UAS hosted communication device, registered with a communication network. The communication network device 200 is operative to determine information related to at least one UAS hosted communication device registered with the communication network. The communication network device 200 is operative to send said information related to at least one UAS hosted communication device to the LI-ADMF or to a mediation and delivery function, MDF, for forwarding to a law enforcement management function, LEMF.

In an embodiment, the request, from the LI-ADMF, to provide information includes a request by the LI-ADMF to receive a list of all communication devices having subscribers that are subscribed to UAV services. The communication network device 200 is operative to send the list of all communication devices having subscribers that are subscribed to UAV services to the LI-ADMF.

In an embodiment, the communication network device 200 is further operative to request user profile information for communication devices and to receive user profile information for communication devices. The communication network device is operative to request the user profile information from a user subscription management device. The user profile information includes UAV context information, which includes an indication that a communication device has a subscriber that is authorised for subscribing to UAV services and at least one flying rule for a UAV hosting the communication device.

In an embodiment, to determine the information related to at least one UAS hosted communication device registered with the communication network, the communication network device 200 is further operative to receive communication device positioning information from a location management function, LMF, and to determine whether at least one flying rule is being broken by the UAV hosting the communication device, based on the positioning information and the UAV context information.

In an embodiment, to determine the information related to at least one UAS hosted communication device registered with the communication network, the communication network device 200 is further operative as follows. The communication network device is operative to receive communication device positioning information from a LMF and to receive information from a communication device about interference on frequencies that the communication device is using. The communication network device is operative to determine that the communication device is acting as integrated access and backhaul, IAB, node, based on the communication device positioning information and the interference information.

In an embodiment, to determine the information related to at least one UAS hosted communication device registered with the communication network, the communication network device 200 is further operative as follows. The communication network device is operative to determine that a communication device has a subscriber that is not authorised for subscribing to UAV services, based on the UAV context information. The communication network device is operative to receive communication device positioning information for the communication device from a LMF and to determine that the communication device is hosted by a UAV, based on the UE positioning information. The communication network device is thus operative to determine that a communication device is being used on a UAV even though it has a subscriber that is not authorised for subscribing to UAV services.

In an embodiment, the user profile information further includes a subscriber identifier of a communication device. To determine said information related to at least one UAS hosted communication device registered with the communication network, the communication network device 200 is further operative to determine a change has occurred in the subscriber identifier of a communication device having a subscriber subscribed to UAV services. The communication network device 200 is thus operative to determine that a change of SIM has occurred on a UAV.

In an embodiment, the communication network device 200 is further operative to receive a request from the LI-ADMF. The request is a request to subscribe for monitoring for LI purposes of a target communication device of the communication devices having subscribers subscribed to UAV services. The communication network device 200 is further operative to send a request to a point of interception, POI, of the communication network to send intercept related information, IRI, to a MDF.

Referring to FIG. 3, an embodiment provides a communication network device 300 hosting a user subscription management device. The communication network device comprises interface circuitry 302, a processor 304 and memory 306. The memory comprises instructions 310 executable by the processor whereby the communication network device 300 is operative as follows. The communication network device 300 is operative to receive a request from a mobility management device for access and mobility subscription, AM, information for a communication device. The communication network device 300 is operative to send AM information for the UE to the mobility management device. The AM information includes user profile information indicative of whether the communication device has a subscriber that is authorized for subscribing to UAV services. The communication network device 300 is further operative to receive a request to provide information related to at least one unmanned aerial system, UAS, hosted communication device, registered with a communication network from a LI-ADMF.

A user subscription management device may be a communication device which comprises a user subscription management entity or function, such as a 3GPP 4G LTE home subscriber server, HSS, or a 3GPP 5G UDM function, and/or a future network corresponding function, such for a 3GPP 6G network.

In an embodiment, the user profile information includes UAV context information. The UAV context information indicates whether the communication device has a subscriber that is authorised for subscribing to UAV services and defines at least one flying rule for a UAV hosting the communication device. In a 3GPP 5G network, the user profile information may be implemented as a UE Context, including a UAV Context.

In an embodiment, the request received from the LI-ADMF includes at least one of:
a request to receive a list of all communication devices having subscribers that are subscribed to UAV services;
a request to provide information to at least one MDF about new communication devices having subscribers that are subscribed to UAV services; or
a request to provide information to at least one MDF about a change of a SIM in a communication device having a subscriber that is subscribed to UAV services.

The communication network device 300 is further operative to send a list of all communication devices having subscribers that are subscribed to UAV services to the LI-ADMF.

The communication network device 300 is further operative to send to at the least one MDF at least one of:

information about new communication devices having subscribers that are subscribed to UAV services; or information about a change of a SIM in a communication device having a subscriber that is subscribed to UAV services.

Figure 4:
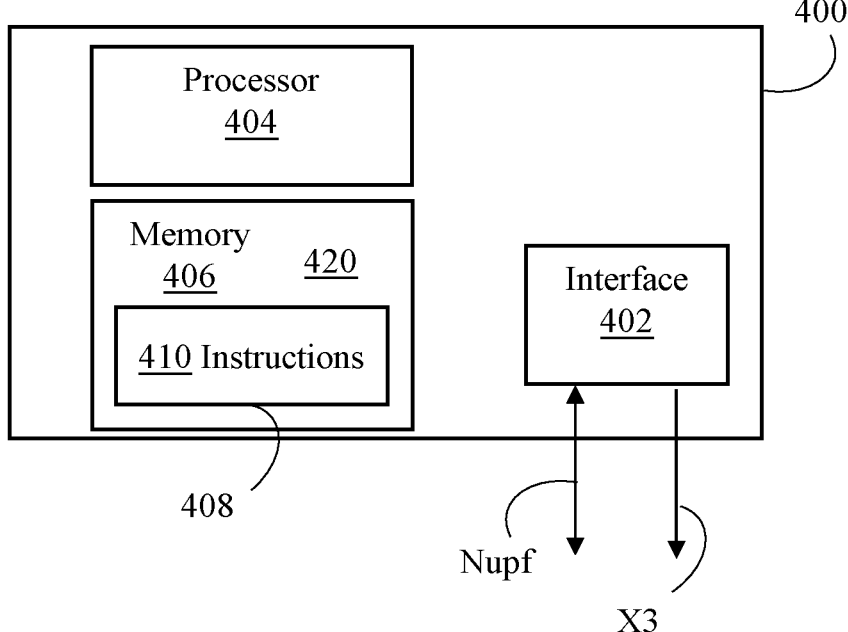
FIG. 4 is a block diagram illustrating an embodiment of a communication network device hosting user payload data management device.

An embodiment provides a communication network device 400 hosting a user payload data management device 400, as illustrated in FIG. 4. The communication network device comprises interface circuitry 402, a processor 404 and memory 406. The memory comprises instructions 410 executable by the processor whereby the communication network device 400 is operative as follows. The communication network device 400 is operative to receive, from a communication network node, a copy of communications data exchanged on a command and control communication link between a first communication device, hosted by a UAV and a second communication device hosted by a UAV controller, the UAV and the UAV controller forming a UAS. The communication network device 400 is operative to send content of communication messages including said copy of communications data to a MDF for forwarding said copy of communications data to a LEMF.

Figure 5:
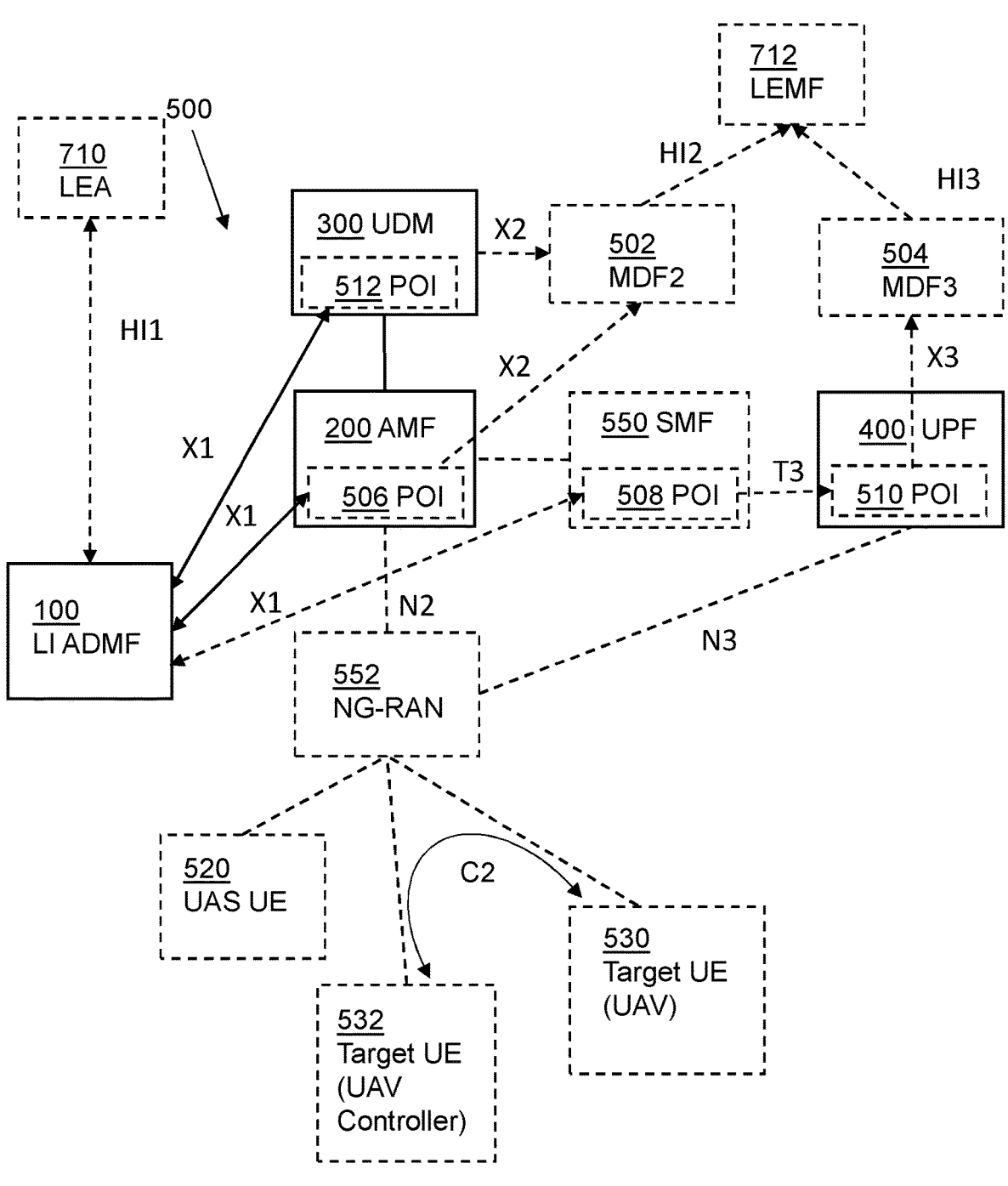
FIGS. 5 and 6 are block diagrams illustrating embodiments of a communication network system.
Figure 6:
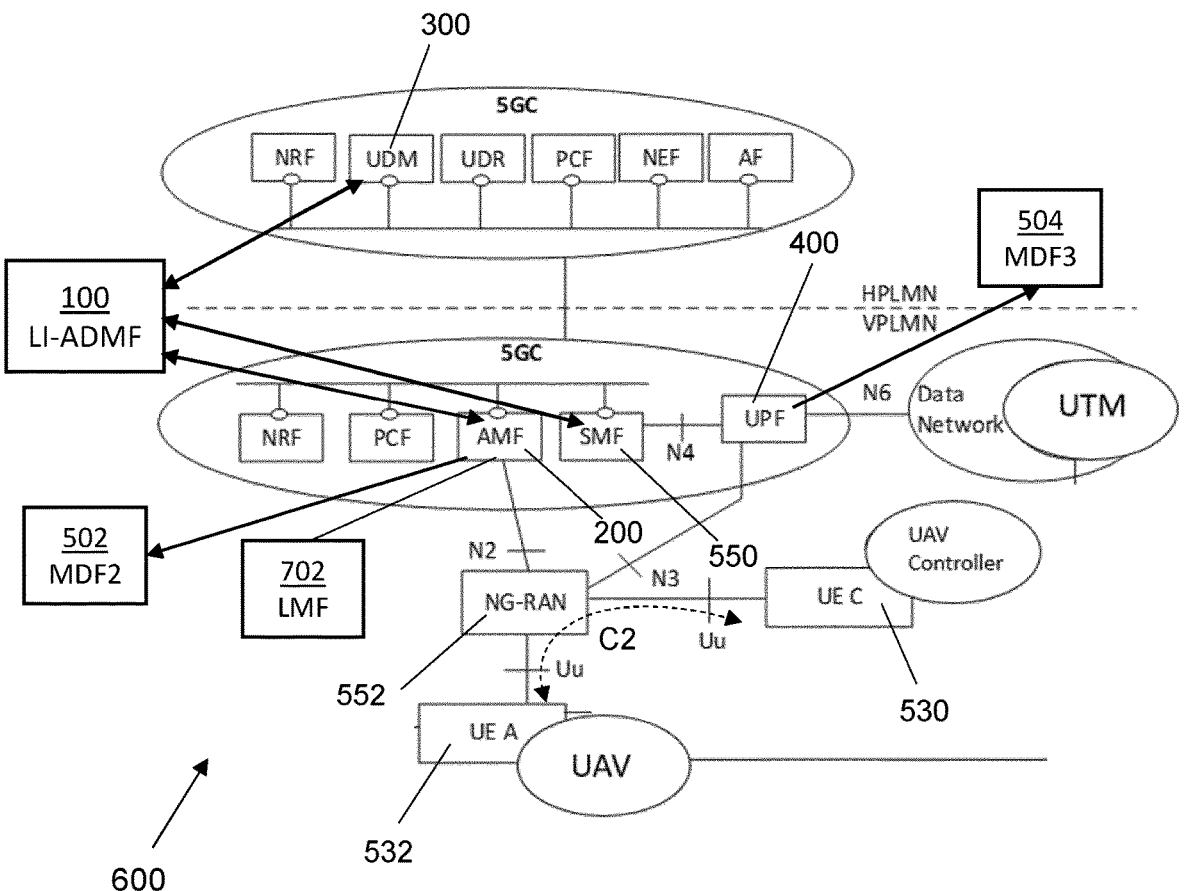

Referring to FIGS. 5 and 6, an embodiment provides a communication network system 500 comprising a first communication network device 100 hosting a LI-ADMF NE, a second communication network device 200 hosting a mobility management device, a third communication network device 300 hosting a user subscription management device and a fourth communication network device 400 hosting a user payload data management device, as described above.

FIGS. 5 and 6 illustrate a communication network system 500, 600 implemented within a 5G network; FIG. 5 only shows the 5G network elements that directly interact with the communication network system 500, while FIG. 6 shows the communication network system 600 within the full standard 5G network architecture. The mobility management device, user subscription management device and user payload data management device are therefore illustrated in their 5G implementations. The mobility management device, hosted by the second communication network device 200, is an access and mobility management function, AMF. The user subscription management device, hosted by the third communication network device 300, is a unified data management function, UDM. The user payload data management device, hosted by the fourth communication network device 400, is a user plane function, UPF. The communication network system 600 additionally includes a location management function, 702, to provide an interface to retrieve detailed positioning information for a UE and to provide location updates to the AMF with a specific periodicity.

In an embodiment, the communication network devices 200, 300, 400, 550 hosting the AMF, UDM, UPF and SMF each have a respective point of interception, POI 506, 512, 510 and 508.

The 5G network illustrated in FIG. 5 includes a session management function, SMF, hosted by a communication network device 550, and a next-generation radio access, NG-RAN, node 552. The NG-RAN node is used by communication devices, in this 5G example user equipment, UEs, 520, 530, 532, to access the 5G network. A first UE 520 is hosted by a UAS, a second UE 530 is hosted by a UAV and a third UE 532 is hosted by a UAV Controller; the UAV and UAV Controller form a second UAS and communicate with each other via direct communication and control, C2, link.

FIG. 5 also illustrates the various interfaces used by the various devices.

HI1 is the interface that allows a law enforcement agency, LEA, to issue a warrant for lawful interception, LI, of a target to the LI-ADMF, as specified in ETSI TS 103 120, for example v1.10.1. HI2 is the interface that an LI system uses to send intercept related information, IRI, from a mediation and delivery function, MDF, to law enforcement management function, LEMF, as specified in TS 102 232-1, for example v3.25.1, and its Service Specific Details specification. It is used here by the MDF2 to send IRI to the LEMF. HI3 is the interface that an LI system uses to send intercepted content of communication, CC, from a mediation and delivery function, MDF, to the LEMF, as specified in TS 102 232-1, for example v3.25.1, and its Service Specific Details specification. It is used here by the MDF3 to send CC to the LEMF.

X1 is the interface that allows a LI system to provision tasks on a Network Function, as specified in ETSI TS 103 221-1. It is used here for communication between the communication device 100 hosting the LI ADMF and the POIs 506, 508, 512 of the communication devices 200, 300, 550 respectively hosting the AMF, UDM and SMF. X2 is the interface that is used in an LI system to transmit intercepted signalling, as specified in ETSI TS 103 221-2. It is used here for communication between the AMF POI 506 and the MDF2 502, and between the UDM POI 512 and MDF2. X3 is the interface that is used in an LI system for transmission of intercepted content of communications (referred to herein as "copy of communications data"), as specified in ETSI TS 103 221-2. It is used here for communication between the UPF POI 510 and the MDF3 504.

T3 is the interface used in an LI system by an SMF to instruct a UPF to intercept a specific packet data unit, PDU, session; this is called 'triggering'. It is specified in ETSI TS 103 221-1, for example v1.10.1, and is used here by the communication device 550 hosting the SMF to trigger the UDM hosted by the third communication device 300.

N2 is the 5G control plane interface, as specified in 3GPP TS 23.501, for example v17.3.0. It is used here for communication between the NG-RAN 552 and the second communication device 200 hosting the AMF. N3 is the 5G user plane interface, as specified in 3GPP TS 23.501, for example v17.3.0. It is used here for communication between the NG-RAN 552 and the fourth communication device 400 hosting the UPF.

As the skilled person will readily understand, the communication network system 500 may equally be implemented within a 4G LTE network, with the mobility management device, user subscription management device and user payload data management device in their 4G LTE implementations. In 4G LTE, the mobility management device, hosted by the second communication network device 200, is a mobility management entity, MME, the user subscription management device, hosted by the third communication network device 300, is a home subscriber server, HSS, and the user payload data management device, hosted by the fourth communication network device 400, is a serving gateway S-GW and a packet gateway (or packet data network gateway), P-GW.

In an embodiment, the communication network system 500 comprises a further communication network device 502, 504, hosting two mediation and delivery functions, MDF2 and MDF3. The communication network devices 502, 504 comprise interface circuitry, a processor and memory. The respective memory comprises instructions executable by the respective processor whereby the respective communication network device is operative as follows.

The communication network device 502 hosting the MDF2 is operative to:

receive intercept related information, IRI, relating to a target communication device and send the IRI to a LEMF;

receive information related to the UAS hosted UEs 520, 530, 532 from the second communication network device 200 and send the information to the LEMF; and receive information related to the UAS hosted UEs 520, 530, 532 from the third communication network device 300 and send the information to the LEMF.

The communication network device 504 hosting the MDF3 is operative to:

receive content of communication messages from the fourth communication device 400. The content of communication messages include a copy of communications data exchanged on the C2 link between a target UE 530 hosted by the UAV and the UE 532 hosted by the associated UAV Controller; the UE 532 may also be a target UE. A target UE is a UE that is the subject LI monitoring, as requested in a warrant sent by the LEA to the LI-ADMF. The fourth communication device 400 receives the copy of communications data from the NG-RAN node 552; and send the copy of communications data to the LEMF.

The user profile information received by the second communication network device 200, in a 5G network context, is a UEContext. A UEContext structure as defined in the standard 3GPP TS 29.518, for example version 16.8.0, may be used and extended to include an additional structure UAVcontext that shall include additional information on the use of the UE and what the UAV is allowed to do.

A new table may be added to 3GPP TS 29.518 to define a new UAV Context Type, as in Table 1 below:

The UAVContext information can include an authorized flight path and a requirement that a monitored target does not deviate from its authorized flight path. This may enable detection of a UAV that is not acting according to the permissions granted to it. At any time, a network operator can remove a subscriber's subscription to UAV services from the UAVContext, to revoke the subscriber's permission to use UAV services.

The communication network system 500 may be used to provide the following to a LEA/LEMF:

List of UAV UEs: The LEA can request to receive a list of all UEs that have a subscriber subscribed to UAV services. LI-ADMF at reception on HI1 of this request will forward it on X1 to the 5G network elements, NEs; AMF, UDM. On LI-ADMF request, the 5G NEs must send a list of all UEs that have a subscriber that is subscribed to UAV services. The LI-ADMF receives the list and forwards it to the LEA. The LEA can then decide to put one of more of the UAV UEs under LI monitoring, i.e. those UEs become LI target UEs.

New UAV services activated: A LEA can request to be informed when a new UAV services subscription is activated. Any time a UAV service is activated for a new subscriber, the second communication network device 200 and third communication network device 300 send the requested information to the MDF2 502, for forwarding to the LEMF. The LEA can then decide whether to request LI monitoring of the UE having the new subscriber.

Change of UE for SIM with UAV services active: A LEA can request to be informed about a change in a subscriber identity module, SIM, in a UE having a subscriber that is subscribed to UAV services. The second communication network device 200 and third communication network device 300 send the requested information to the MDF2 502, for forwarding to the LEMF. The LEA can then decide whether to request LI monitoring of the UE that has had its SIM changed.

TABLE 1

| Definition of type UAV Context | | | | |
|---|---|---|---|---|
| Attribute name | Data type | P | Cardinality | Description |
| nrUAVservicesAuth | NrUAVauth | C | 0 . . . 1 | This IE shall be present if the UE is authorized to use the NR UAV for UAV services. |
| lteUAVservicesAuth | LteUAVauth | C | 0 . . . 1 | This IE shall be present if the UE is authorized to use the LTE UAV for UAV services. |
| nrUeAmbr | BitRate | C | 0 . . . 1 | This IE shall be present if the UE is authorized for NR UAV services. When present, this IE contains subscription data on UE- AMBR for NR UAV services. |
| lteUeAmbr | BitRate | C | 0 . . . 1 | This IE shall be present if the UE is authorized for LTE UAV services. When present, this IE contains subscription data on UE- AMBR for LTE UAV services. |
| UAVheightAuth | Height | C | | Maximum height the drone can reach |
| UAVrange | Range | C | | Maximum height the drone can reach |
| UAVFlightRegion | FlightRegion | C | | local, regional, national, international |
| QoSPara | UAVQoSPara | C | 0 . . . 1 | This IE shall be present if the UE is authorized for NR UAV services. When present, this IE contains policy data on the QoS parameters. |
| LocationUpdate interval | Interval | C | 0 . . . 10000 | Interval in milliseconds for the location update collection |
| CurrentFlightPlan | path | C | 1 | A description of the flight plan in terms of a path made of 3D locations |

UAV violating flying rules: positioning provided by a location management function, LMF, 702 is used to identify violation of UAV flight rules. The flight rules that can be considered are: the UAV deviating from a predefined flight path; the UAV exceeding a permitted height for its UAV license; and whether the UAV is flying over 'no fly' zones and could collect images or be used to monitor persons or vehicles for an illegal use.

UAV used for private communication: A UAV UE may be used as an integrated access and backhaul, IAB, node to relay communications data. The detection of this type of unauthorized IAB may be identified by cross-relating position and interference on the frequencies used, reported by other stations or by the UAV UE.

UEs discovered to be a UAV but not subscribed as such: The positioning of an UE may be used to deduce that it is being used in a UAV by considering the UE velocity and height and if the UE is indoor or outdoor.

The third communication network device 300, hosting the UDM, is operative to provide information directly to the LI-ADMF 100 and to MDF2 502, as illustrated in FIGS. 5 and 6. In case of Lawful Disclosure, i.e. the list of all UAVs having subscribers subscribed to UAV services, the data from the UDM is sent in a response message on X1 to the LI-ADMF. In case of LI, being the other use cases described above, the data is sent from the third communication device hosting the UDM to MDF2 on X2.

FIGS. 7 to 11 show signalling within the communication network system 600 of FIG. 6.

Figure 7:
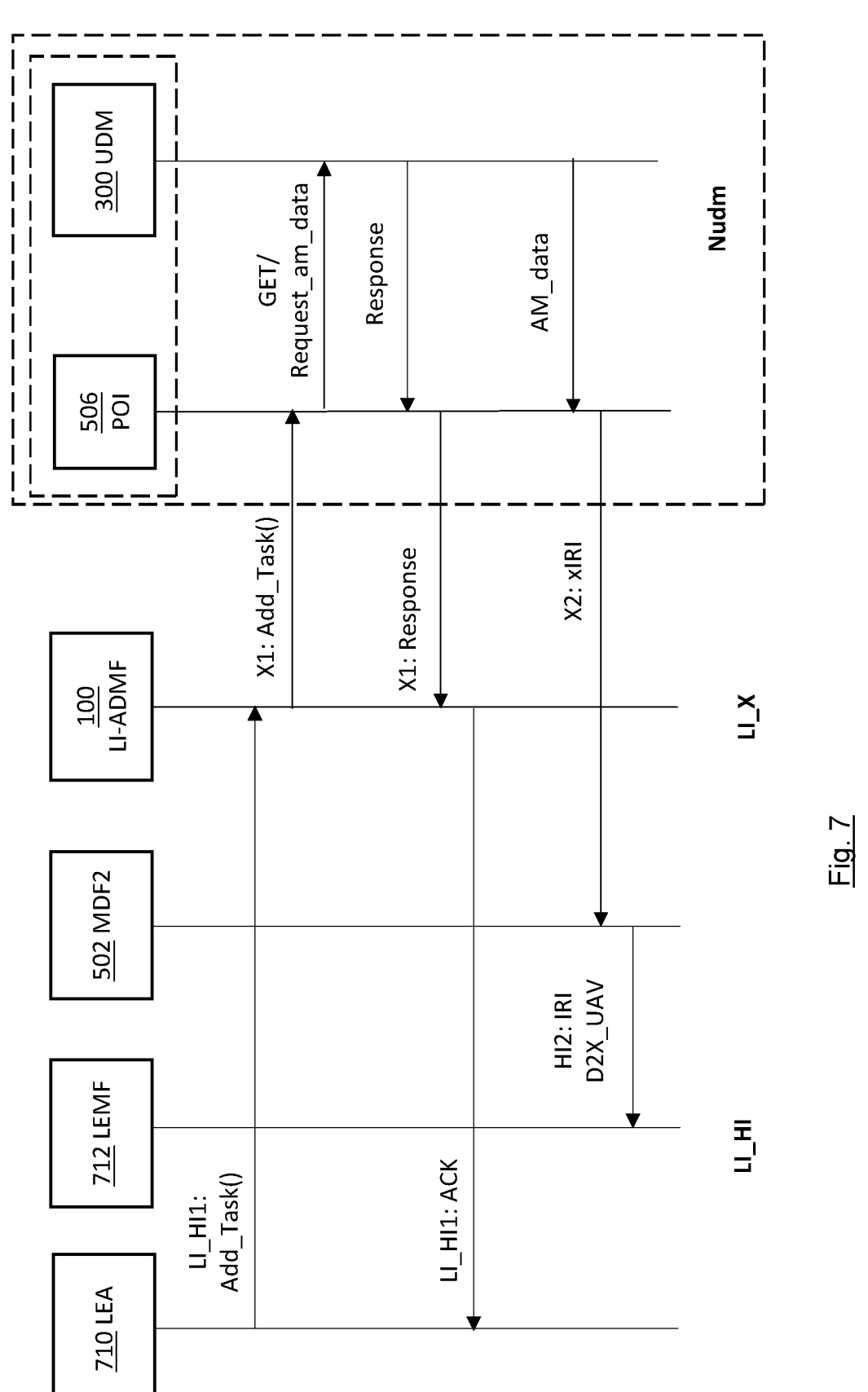
FIGS. 7 to 11 are signalling diagrams illustrating an exchange of signals in an embodiment of a communication network system.

FIG. 7 illustrates the signalling when a new target UE is added to the LI-ADMF. A new task is created by the LEA 710 sending a LI_HI1:Add_Task( ) message to the LI-ADMF and the LI-ADMF sending an X1:Add_Task( ) message to the UDM POI 506. The POI 506 sends a GET/Request_am_data message to the UDM 300 to request AM data about the new target UE. The UDM sends a Response message back to the POI, which sends an X1: Response message back to the LI-ADMF, which sends an LI_HI1: ACK message back to the LEA.

FIG. 7 also illustrates the signalling when new data related to the Task is available. The UDM sends an AM_data message to the POI containing AM data, which should include the fields nrUAVServicesAuth from the UAVContext if present in the UEContext of the new target UE, as in Table 1 above. The POI 506 sends an X2:xIRI message to the MDF2 502 containing the AM data, and the MDF2 forward the received AM data to the LEMF 712 in an HI2: IRI D2X_UAV message.

Figure 8:
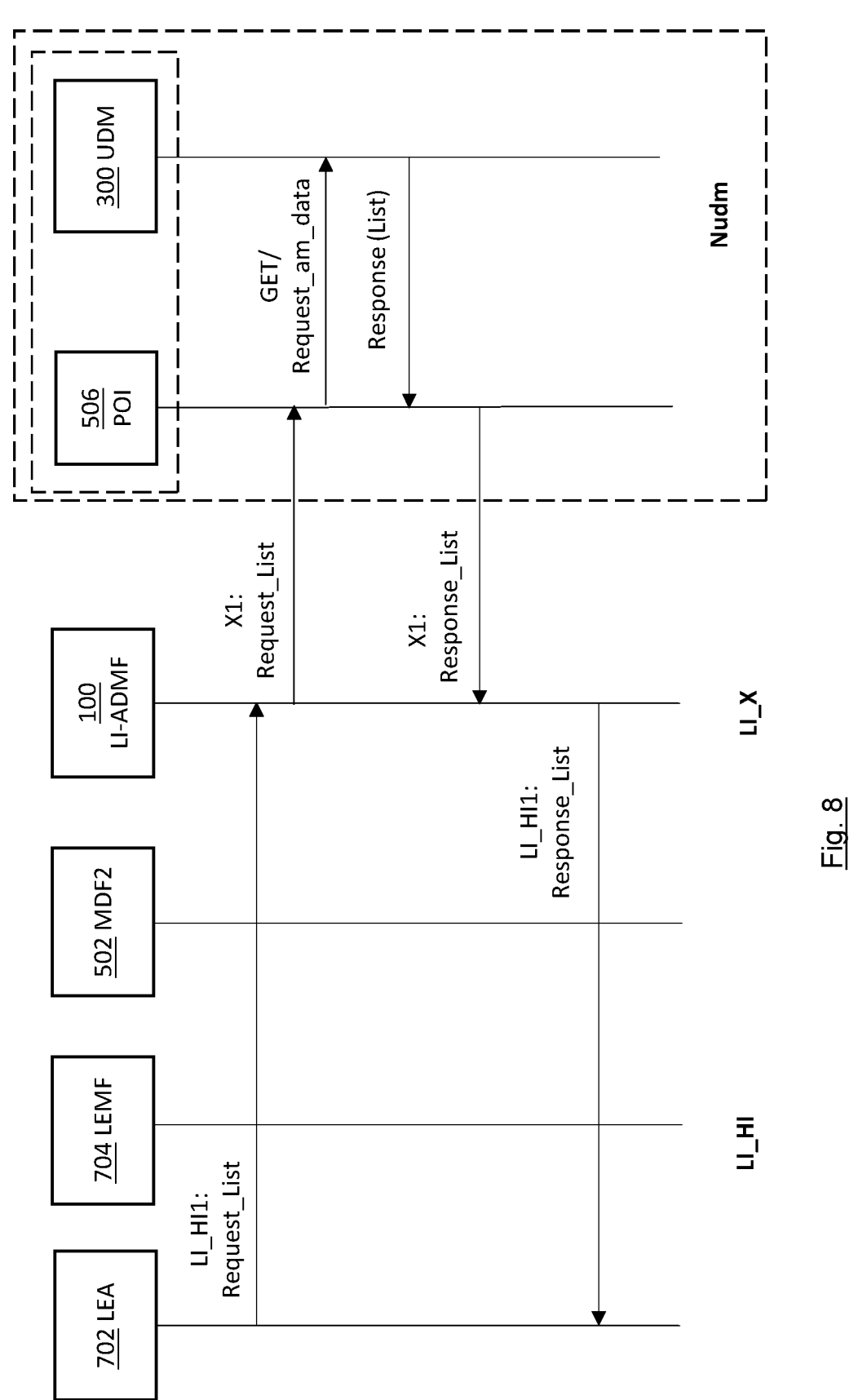

FIG. 8 illustrates the signalling when the LEA 702 requests a list of all UEs having subscribers that are subscribed to UAV services. The LEA sends an LI-HI1: List_Request message to the LI-ADMF 100. The LI-ADMF sends an X1: Request_List message to the POI 506. The POI sends a GET/Request_am_data message to the UDM 300 to request the List. The UDM sends a Response message back to the POI including the List. The POI sends an X1: Response_List message to the LI-ADMF including the List and the LI-ADMF sends an LI_HI1: Response_List message to the LEA including the List.

Figure 9:
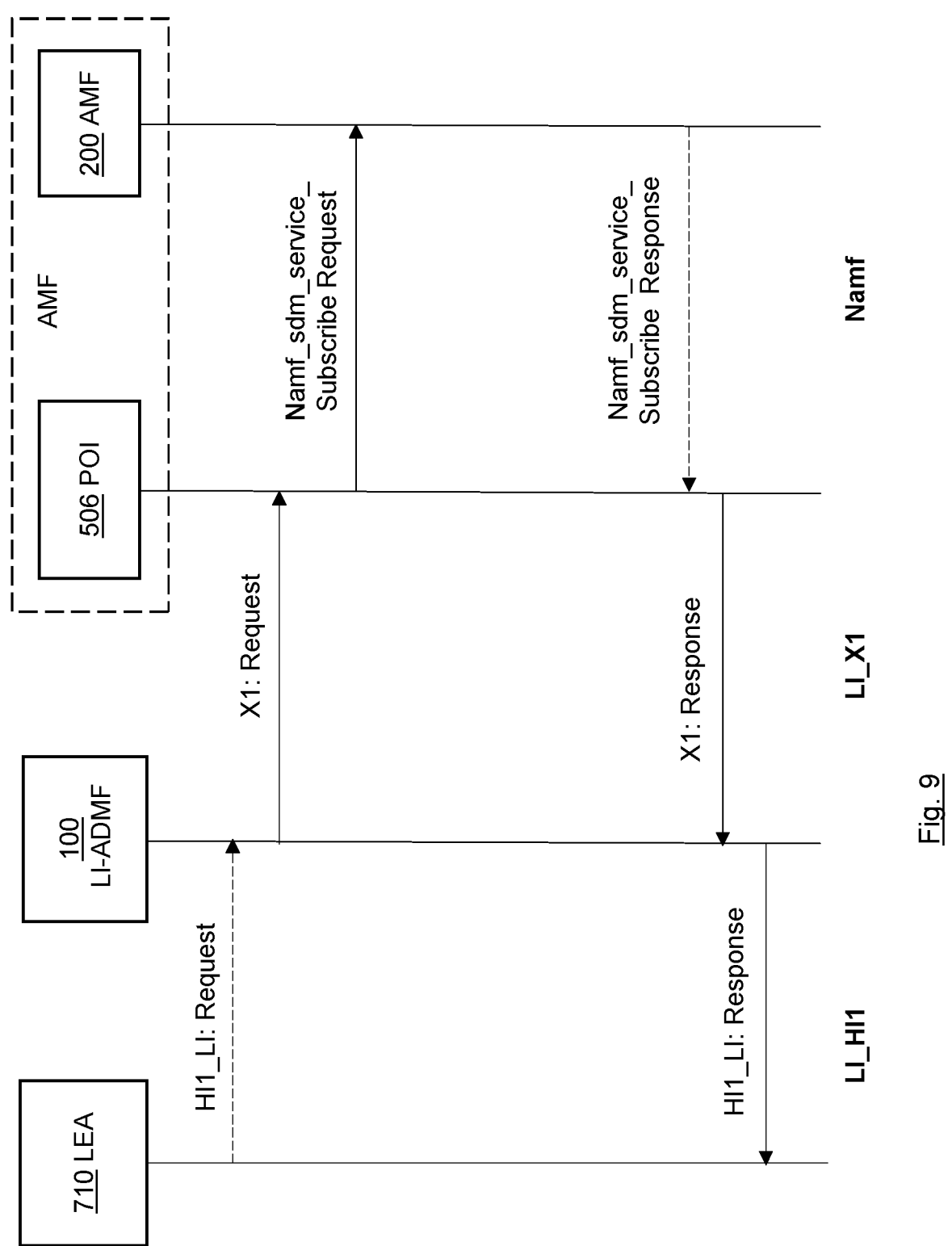

FIG. 9 illustrates the signalling to subscribe an LEA to receive notifications of UEs having subscribers that are subscribed to UAV services registering with the network. The LEA 710 sends an LI Request message on HI1 to the LI-ADMF 100 requesting subscription to notification from the AMF of UEs having subscribers that are subscribed to UAV services registering with the network. The LI-ADMF forwards the subscription request to the AMF POI 506 in an X1 Request message. The POI sends an Namf_sdm_service_Subscribe Request message to the AMF 200 to subscribe the LEA. The AMF sends an Namf_sdm_service_Subscribe Response message back to the POI to confirm subscription of the LEA, the POI sends an X1 Response message back to the LI-ADMF to confirm the subscription, and the LI-ADMF sends an HI1 LI Response message back to the LEA to confirm the subscription.

Figure 10:
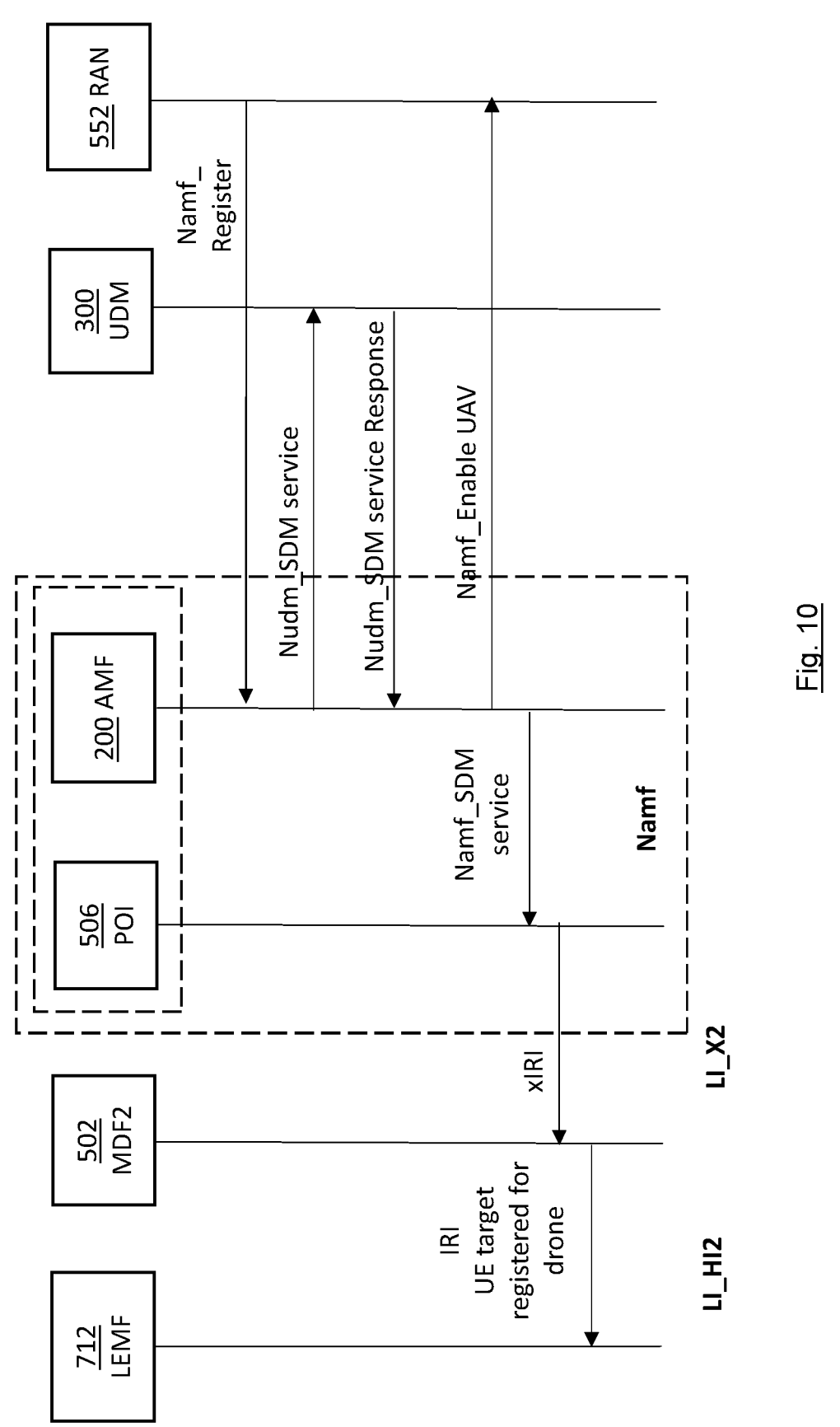
Figure 11:
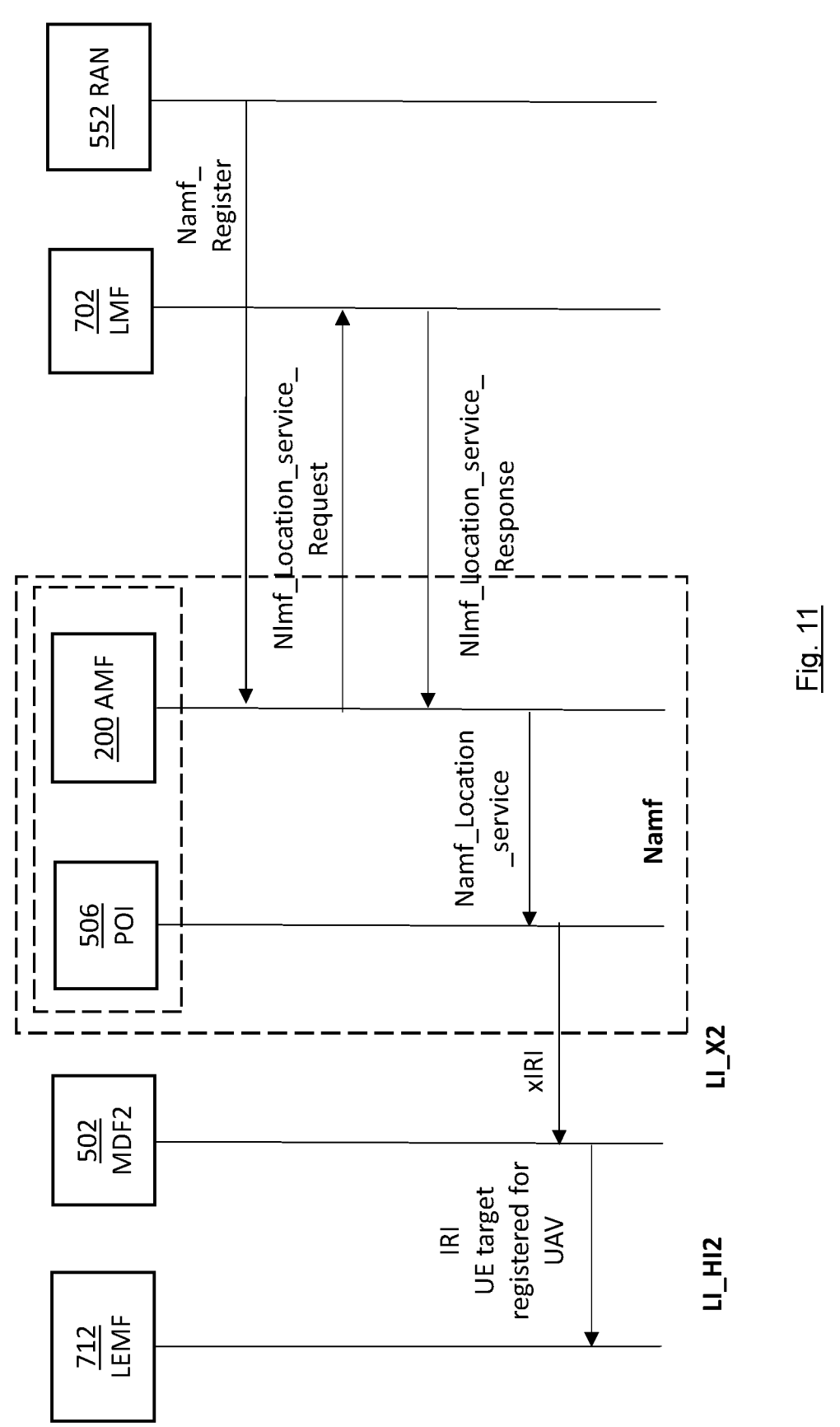
Figure 12:
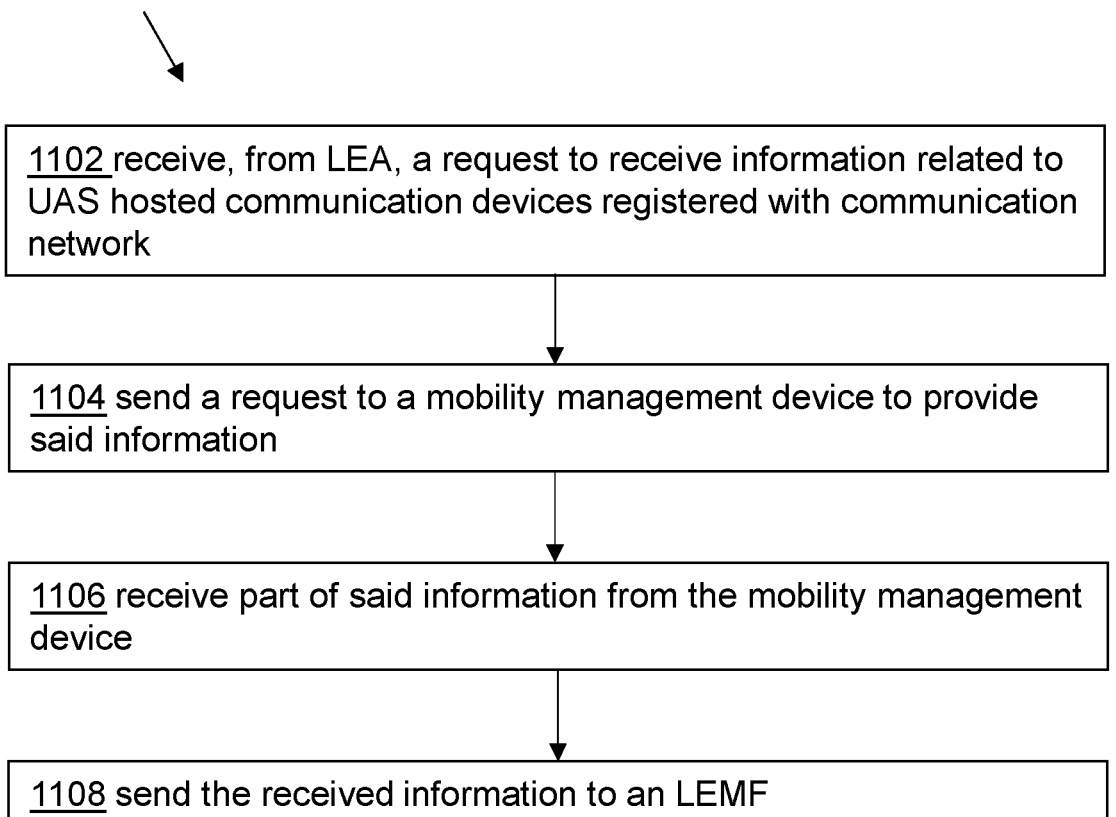

FIGS. 10 and 11 illustrate the signalling, after the subscription of the LEA illustrated in FIG. 9, when a UE having a subscriber that is subscribed to UAV services requests to be registered via the NG-RAN 552 to AMF service. The NG-RAN 552 sends a Namf_Register message to the AMF 200.

As illustrated in FIG. 10, the AMF sends a Nudm_SDM_service Request message to the UDM 300 to check the UE services that the UE subscriber is subscribed to. The UDM sends an Nudm_SDM service Response message back to the AMF including information about whether the UE has a subscriber that is authorised to subscribe to UAV services. The AMF sends an Namf_Enable UAV message back to the RAN including information about the possibility for the UE to use UAV services. Namf_Enable UAV message is a new message to specifically enable UAV location tracking, sent from AMF to the NG-RAN (eNB). The message shall specify if the info about the UE UAV (CC) has to be provided to AMF and UPF nodes, and if UAV can be accepted or must be avoided at all by the NG-RAN.

The AMF 200 also sends an Namf_SDM service message to the POI 506 including the information that the UE has a subscriber that is authorised to use UAV services. The POI forwards this information in an xIRI message to the MDF2 502, which sends an IRI UE target registered for UAV message to the LEMF 712.

As illustrated in FIG. 11, the AMF 200 sends an NImf_Location_service request message to the LMF 702 to register for location updates in case of UAVs with a predefined periodicity as specified in the UAVContext.LocationUpdateInterval field of the UAVContext, as in Table 1 above. The LMF sends an NImf_Location_service response message back to the AMF confirmation registration. The AMF then sends an Namf_Location_service message to the POI 506 reporting registration of location updates for the UE, the POI sends an XIRI message to the MDF2 502 reporting registration of location updates for the UE and the MDF2 sends an IRI UE target registered for UAV message to the LEMF 712 reporting registration of location updates for the UE.

An embodiment provides a method 1100, 1200, 1300, 1400 for monitoring unmanned aerial systems, UAS, in a communication network, as illustrated in FIGS. 12 to 15.

The method comprises the following performed 1100 by a lawful interception administration function, LI-ADMF, network element, NE:

receiving 1102, from a law enforcement agency, LEA, a request to receive information related to at least one unmanned aerial system, UAS, hosted communication device registered with the communication network;

sending 1104 a request to a mobility management device to provide said information;

receiving 1106 part of said information from the mobility management device; and sending 1108 the received information to a law enforcement management function, LEMF.

The method further comprises the following performed 1200 by mobility management device, as follows:

receiving 1204, from the LI-ADMF, said request to provide information related to at least one UAS hosted communication device registered with the communication network;

determining 1206 information related to at least one UAS hosted communication device registered with the communication network; and sending 1208 said information to the LI-ADMF or to a mediation and delivery function, MDF, for forwarding to a law enforcement management function, LEMF.

The method further comprises the following performed 1300 by a user subscription management device, as follows:

receiving 1302 a request from the mobility management device for access and mobility subscription, AM, information for a communication device; and sending 1304 AM information for the communication device to the mobility management device, the AM information including user profile information indicative of whether the communication device has a subscriber that is authorized for subscribing to unmanned aerial vehicle, UAV, services.

The method further comprises the following performed 1400 by a user payload data management device plane function, UPF, network element, NE:

receiving 1402 from a communication network node a copy of communications data exchanged on a command and control communication link between a first communication device, hosted by an unmanned aerial vehicle, UAV, and a second communication device, hosted by a UAV controller, the UAV and the UAV controller forming an unmanned aerial system, UAS; and sending 1404 content of communication messages including said copy of communications data to a mediation and delivery function, MDF, for forwarding said copy of communications data to a law enforcement management function, LEMF.

In an embodiment, the method further comprises at least one of the following performed by an MDF2:

receiving intercept related information relating to a target communication device and sending the intercept related information to a law enforcement management function, LEMF;

receiving information related to at least one unmanned aerial system, UAS, hosted communication device registered with a communication network from the second communication network device and sending said information to the LEMF; and receiving information related to at least one UAS hosted communication device registered with the communication network from the third communication network device and sending said information to the LEMF.

In an embodiment, the method further comprises the following performed by an MDF3:

receiving content of communication messages including a copy of communications data exchanged on a command and control communication link between a first communication device, hosted by an unmanned aerial vehicle, UAV, and a second communication device hosted by a UAV controller, the UAV and the UAV controller forming an unmanned aerial system, UAS, and sending said copy of communications data to an LEMF.

In an embodiment, the method further comprises the following performed by the LI-ADMF NE:

receiving from the LEA a request for monitoring for lawful interception, LI, purposes of a target communication device of the communication devices having subscribers subscribed to UAV services; and sending to the mobility management device a request to subscribe for monitoring for LI purposes of the target communication device.

The method further comprises the following performed by the mobility management device:

receiving from the LI-ADMF NE the request to subscribe for monitoring for LI purposes of the target communication device; and sending a request to a point of interception, POI, of the communication network to send intercept related information to a mediation and delivery function, MDF.

The method further comprises the following performed by the user payload data management device:

receiving from a communication network node a copy of communications data exchanged on a command and control communication link used by the target communication device; and sending content of communication messages including said copy of communications data to a mediation and delivery function, MDF, for forwarding said copy of communications data to the law enforcement management function, LEMF.

Figure 16:
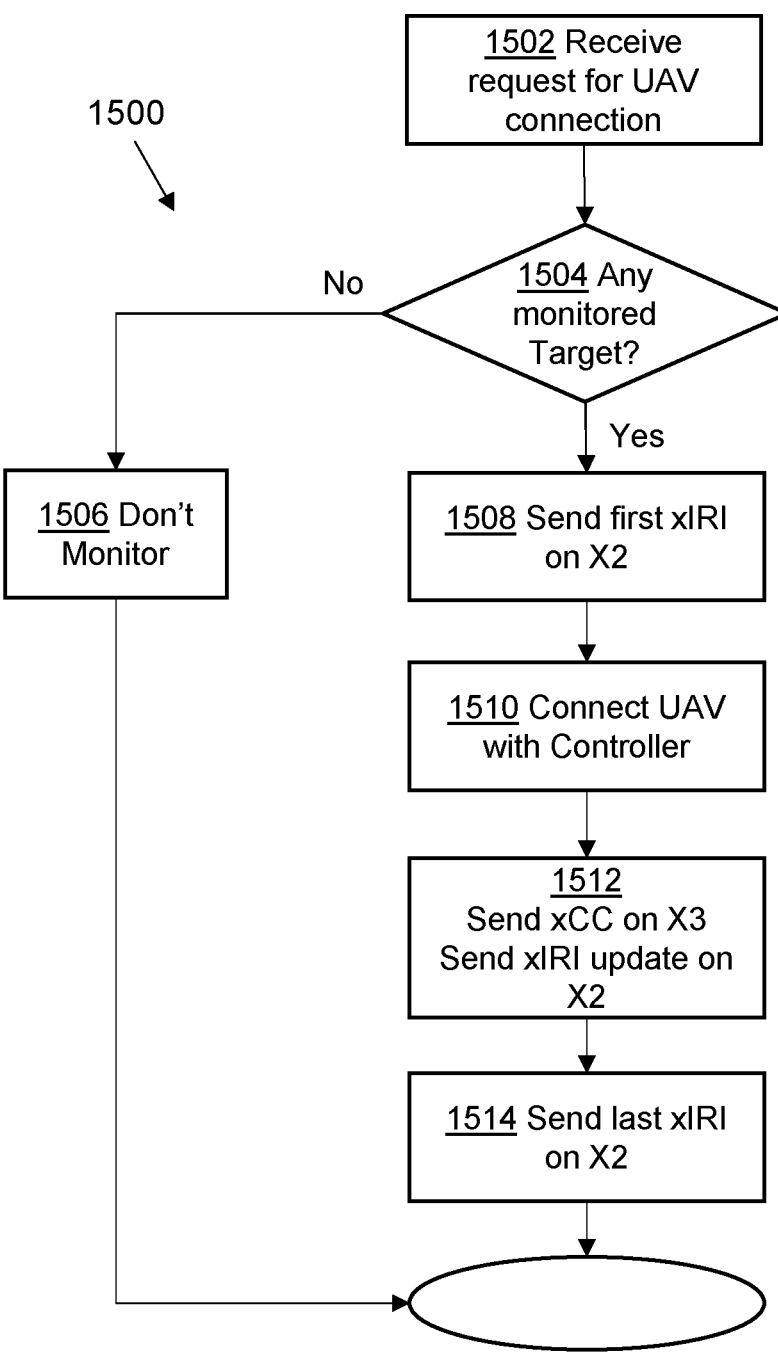

An embodiment provides a method 1500 for monitoring UAS in a communication network, as illustrated in FIG. 16.

At reception 1502 of a UAV connection request, checking 1504 whether there is a target UE monitored for LI purposes involved. If a monitored target UE is involved, the AMF sends an xIRI message on X2 to MDF2, the xIRI message includes intercept related information, IRI. The MDF2 sends the IRI to the LEMF via HI2. The IRI reports the communication type as a UAV with specific information sent over the link to the UAV controller. The UAV is connected 1510 with its UAV Controller. All communications data exchanged between the UAV and the UAV Controller is sent 1512 as content of communication messages, xCC, to the MDF3 via X3 by the UPF. All other xIRI are sent 1512 to MDF2 via X2 by the AMF. When the connection is terminated a last xIRI message is sent 1514 on X2.

An xIRI Conversation start message is sent to indicate that a UAV conversation with a UAV controller has started. An XIRI Conversation continue message is sent to indicate a change in an ongoing UAV conversation with the UAV controller. xCC messages are sent including a copy of the communications data exchanged between the UAV and the UAV Controller. An XIRI Conversation end message is sent to indicate a UAV conversation with the UAV controller has finished. All other received info, if any, on the UAV connection is sent via xIRI on X2.

An embodiment provides a computer program 108 comprising instructions 110 which when executed by a processor 104 cause a first communication network device 100 to perform the method 1100 described above.

An embodiment provides a computer program product 120 which comprises a computer readable storage medium on which the computer program 108 is stored.

An embodiment provides a computer program 208 comprising instructions 210 which when executed by a processor 204 cause a second communication network device 200 to perform the method 1200 described above.

An embodiment provides a computer program product 220 which comprises a computer readable storage medium on which the computer program 208 is stored.

An embodiment provides a computer program 308 comprising instructions 310 which when executed by a processor

304 cause a third communication network device 300 to perform the method 1300 described above.

An embodiment provides a computer program product 320 which comprises a computer readable storage medium on which the computer program 308 is stored.

An embodiment provides a computer program 408 comprising instructions 410 which when executed by a processor 404 cause a fourth communication network device 400 to perform of the method 1400 described above.

An embodiment provides a computer program product 420 which comprises a computer readable storage medium on which the computer program 408 is stored.

The invention claimed is:

1. A communication network device hosting a lawful interception administration function, LI-ADMF, network element, NE, the communication network device comprising interface circuitry, at least one processor and memory comprising instructions executable by the at least one processor whereby the communication network device is configured to:

receive, from a law enforcement agency, LEA, a request to receive information related to at least one unmanned aerial system, UAS, hosted communication device registered with a communication network;

send a request to at least one of a mobility management device or a user subscription management device to provide the information, the request to provide information including at least one of:

a request to receive a list of all communication devices having subscribers that are subscribed to UAV services;

a request to provide information to at least one mediation and delivery function, MDF, about new communication devices having subscribers that are subscribed to UAV services;

a request to provide information to at least one MDF about a change of a subscriber identity module, SIM, in a communication device having a subscriber that is subscribed to UAV services;

a request to provide information to at least one MDF about communication devices having subscribers that are subscribed to UAV services violating at least one flying rule;

a request to provide information to at least one MDF about communication devices having subscribers that are subscribed to UAV services being used as an integrated access and backhaul, IAB, node; or a request to provide information to at least one MDF about at least one UAS hosted communication device having a subscriber that is not subscribed to UAV services;

receive at least part of the requested information from at least one of the mobility management device or the user subscription management device; and send the received information to a law enforcement management function, LEMF.

2. The communication network device of claim 1, wherein the communication network device is further operative configured to receive a list of all communication devices having subscribers that are subscribed to UAV services from the user subscription management device.

3. The communication network device of claim 2, wherein: the communication network device is further configured to:

receive from the LEA a request for monitoring for lawful interception, LI, purposes of a target communication device of the communication devices having subscribers that are subscribed to UAV services; and send to the mobility management device a request to subscribe for monitoring for LI purposes of the target communication device.

4. A communication network device hosting a mobility management device, the communication network device comprising interface circuitry, at least one processor and memory comprising instructions executable by the at least one processor whereby the communication network device is operative configured to:

receive, from a lawful interception administration function, LI-ADMF, a request to provide information related to at least one unmanned aerial system, UAS, hosted communication device, registered with a communication network;

determine information related to at least one UAS hosted communication device registered with the communication network, determining the information, the communication network device comprising being further configured to:

determine whether at least one flying rule is being broken by an unmanned aerial vehicle, UAV, hosting the communication device, determine that the communication device is acting as an integrated access and backhaul, IAB, node, determine that the communication device is hosted by the UAV, and determine a change has occurred in a subscriber identifier of the communication device having a subscriber subscribed to UAV service; and send the information to the LI-ADMF or to a mediation and delivery function, MDF, for forwarding to a law enforcement management function, LEMF.

5. The communication network device of claim 4, wherein:

the request to provide information includes a request to receive a list of all communication devices having subscribers that are subscribed to unmanned aerial vehicle, UAV, services; and the communication network device is configured to send the list of all communication devices having subscribers that are subscribed to UAV services to the LI-ADMF.

6. The communication network device of claim 4, wherein the communication network device is further configured to:

request user profile information for communication devices from a user subscription management device; and receive user profile information for communication devices, the user profile information including UAV context information including an indication that a communication device has a subscriber that is authorised for subscribing to UAV services and at least one flying rule for a UAV hosting the communication device.

7. The communication network device of claim 6, wherein to determine the information the communication network device is further configured to:

receive communication device positioning information from a location management function, LMF; and determine based on the positioning information and the UAV context information whether at least one flying rule is being broken by the UAV hosting the communication device.

8. The communication network device of claim 4, wherein to determine the information the communication network device is further configured to:

receive communication device positioning information from a location management function, LMF;

receive information from a communication device about interference on frequencies that the communication device is using; and determine based on the communication device positioning information and the interference information that the communication device is acting as integrated access and backhaul, IAB, node.

9. The communication network device of claim 6, wherein to determine the information the communication network device is further configured to:

determine based on the UAV context information that a communication device has a subscriber that is not authorised for subscribing to UAV services;

receive communication device positioning information for the communication device from a location management function, LMF; and determine based on the UE positioning information that the communication device is hosted by a UAV.

10. The communication network device of claim 6, wherein the user profile information further includes a subscriber identifier of a communication device and wherein to determine the information the communication network device is further configured to determine a change has occurred in the subscriber identifier of a communication device having a subscriber subscribed to UAV services.

11. The communication network device of claim 4, wherein the communication network device is further configured to:

receive from the LI-ADMF a request to subscribe for monitoring for lawful interception, LI, purposes of a target communication device of the communication devices having subscribers subscribed to UAV services; and send a request to a point of interception, POI, of the communication network to send intercept related information to a mediation and delivery function, MDF.

12. A communication network device hosting a user subscription management device, the communication network device comprising interface circuitry, at least one processor and memory comprising instructions executable by the at least one processor whereby the communication network device is configured to:

receive a request from a mobility management device for access and mobility subscription, AM, information for a communication device;

send AM information for the UE to the mobility management device, the AM information including user profile information indicative of whether the communication device has a subscriber that is authorized for subscribing to unmanned aerial vehicle, UAV, services; and receive a request from a lawful interception administration function, LI-ADMF, to provide information related to at least one unmanned aerial system, UAS, hosted communication device, registered with a communication network, the request received from the LI-ADMF including at least one of:

a request to receive a list of all communication devices having subscribers that are subscribed to UAV services;

a request to provide information to at least one mediation and delivery function, MDF, about new communication devices having subscribers that are subscribed to UAV services; or a request to provide information to at least one MDF about a change of a subscriber identity module, SIM, in a communication device having a subscriber that is subscribed to UAV services;

and the communication network device being further configured to:

send a list of all communication devices having subscribers that are subscribed to UAV services to the LI-ADMF; and send to at the least one MDF at least one of:

information about new communication devices having subscribers that are subscribed to UAV services; or information about a change of a subscriber identity module, SIM, in a communication device having a subscriber that is subscribed to UAV services.

13. The communication network device of claim 12, wherein the user profile information includes UAV context information indicating whether the communication device has a subscriber that is authorised for subscribing to UAV services and defining at least one flying rule for a UAV hosting the communication device.

14. A method for monitoring unmanned aerial systems, UAS, in a communication network, the method comprising:

by a lawful interception administration function, LI-ADMF, network element, NE:

receiving, from a law enforcement agency, LEA, a request to receive information related to at least one unmanned aerial system, UAS, hosted communication device registered with the communication network;

sending a request to a mobility management device to provide the information, the request to provide information including at least one of:

a request to receive a list of all communication devices having subscribers that are subscribed to UAV services;

a request to provide information to at least one mediation and delivery function, MDF, about new communication devices having subscribers that are subscribed to UAV services;

a request to provide information to at least one MDF about a change of a subscriber identity module, SIM, in a communication device having a subscriber that is subscribed to UAV services;

a request to provide information to at least one MDF about communication devices having subscribers that are subscribed to UAV services violating at least one flying rule;

a request to provide information to at least one MDF about communication devices having subscribers that are subscribed to UAV services being used as an integrated access and backhaul, IAB, node; or a request to provide information to at least one MDF about at least one UAS hosted communication device having a subscriber that is not subscribed to UAV services;

receiving part of the information from the mobility management device; and sending the received information to a law enforcement management function, LEMF;

by the mobility management device:

receiving, from the LI-ADMF, the request to provide information related to at least one UAS hosted communication device registered with the communication network;

determining information related to at least one UAS hosted communication device registered with the communication network, determining the information, comprising:

determining whether at least one flying rule is being broken by an unmanned aerial vehicle, UAV, hosting the communication device;

determining that the communication device is acting as integrated access and backhaul, IAB, node;

determining that the communication device is hosted by the UAV; and determining a change has occurred in a subscriber identifier of the communication device having a subscriber subscribed to UAV service; and sending the information to the LI-ADMF or to a mediation and delivery function, MDF, for forwarding to a law enforcement management function, LEMF;

by a user subscription management device:

receiving a request from the mobility management device for access and mobility subscription, AM, information for a communication device; and sending AM information for the communication device to the mobility management device, the AM information including user profile information indicative of whether the communication device has a subscriber that is authorized for subscribing to unmanned aerial vehicle, UAV, services; and by a user payload data management device:

receiving from a communication network node a copy of communications data exchanged on a command and control communication link between a first communication device, hosted by an unmanned aerial vehicle, UAV, and a second communication device, hosted by a UAV controller, the UAV and the UAV controller forming an unmanned aerial system, UAS; and sending content of communication messages including the copy of communications data to a mediation and delivery function, MDF, for forwarding the copy of communications data to a law enforcement management function, LEMF.

15. The method of claim 14, further comprising, at a mediation and delivery function, MDF, at least one of:

receiving intercept related information relating to a target communication device and sending the intercept related information to a law enforcement management function, LEMF;

receiving information related to at least one unmanned aerial system, UAS, hosted communication device registered with a communication network from the second communication network device and sending the information to the LEMF;

receiving information related to at least one UAS hosted communication device registered with the communication network from the third communication network device and sending the information to the LEMF; or receiving content of communication messages including a copy of communications data exchanged on a command and control communication link between a first communication device, hosted by an unmanned aerial vehicle, UAV, and a second communication device hosted by a UAV controller, the UAV and the UAV controller forming an unmanned aerial system, UAS, and sending the copy of communications data to the LEMF.

16. The method of claim 14, further comprising:

by the LI-ADMF NE:

receiving from the LEA a request for monitoring for lawful interception, LI, purposes of a target communication device of the communication devices having subscribers subscribed to UAV services; and sending to the mobility management device a request to subscribe for monitoring for LI purposes of the target communication device;

by the mobility management device:

receiving from the LI-ADMF NE the request to subscribe for monitoring for LI purposes of the target communication device; and sending a request to a point of interception, POI, of the communication network to send intercept related information to a mediation and delivery function, MDF; and by the user payload data management device:

receiving from a communication network node a copy of communications data exchanged on a command and control communication link used by the target communication device; and sending content of communication messages including the copy of communications data to a mediation and delivery function, MDF, for forwarding the copy of communications data to the law enforcement management function, LEMF.

* * * * *